(12) United States Patent
Desberg et al.

(10) Patent No.: US 12,214,841 B2
(45) Date of Patent: Feb. 4, 2025

(54) ELECTRIC BALANCE VEHICLES

(71) Applicant: RAZOR USA LLC, Cerritos, CA (US)

(72) Inventors: Ian Desberg, Cerritos, CA (US);
Robert Hadley, Yorba Linda, CA (US);
Robert Chen, San Marino, CA (US)

(73) Assignee: RAZOR USA LLC, Cerritos, CA (US)

( * ) Notice: Subject to any disclaimer, the term of this patent is extended or adjusted under 35 U.S.C. 154(b) by 0 days.

(21) Appl. No.: 18/320,794

(22) Filed: May 19, 2023

(65) Prior Publication Data
US 2024/0025507 A1 Jan. 25, 2024

Related U.S. Application Data

(63) Continuation of application No. 16/230,873, filed on Dec. 21, 2018, now Pat. No. 11,654,995.

(60) Provisional application No. 62/629,884, filed on Feb. 13, 2018, provisional application No. 62/628,789, filed on Feb. 9, 2018, provisional application No. 62/610,103, filed on Dec. 22, 2017.

(51) Int. Cl.
*B62K 11/00* (2006.01)
*B62M 7/12* (2006.01)

(52) U.S. Cl.
CPC ............. *B62K 11/007* (2016.11); *B62M 7/12* (2013.01); *B62K 2202/00* (2013.01)

(58) Field of Classification Search
CPC ..... B62K 11/007; B62K 2202/00; B62M 7/12
See application file for complete search history.

(56) References Cited

U.S. PATENT DOCUMENTS

| | | | |
|---|---|---|---|
| 3,860,264 A | 1/1975 | Douglas et al. |
| 4,065,146 A | 12/1977 | Denzer |
| 4,076,270 A | 2/1978 | Winchell |
| 4,151,892 A | 5/1979 | Francken |
| 4,281,734 A | 8/1981 | Johnston |
| 4,325,565 A | 4/1982 | Winchell |
| 4,354,569 A | 10/1982 | Eichholz |
| 4,484,648 A | 11/1984 | Jephcott |

(Continued)

FOREIGN PATENT DOCUMENTS

| | | |
|---|---|---|
| CA | 2903571 A1 | 12/2015 |
| CN | 2486450 Y | 4/2002 |

(Continued)

OTHER PUBLICATIONS

Extended Search Report in corresponding European Patent Application No. 18890822.2, dated Aug. 26, 2021, in 13 pages.

(Continued)

*Primary Examiner* — Tony H Winner
(74) *Attorney, Agent, or Firm* — Knobbe, Martens, Olson & Bear, LLP

(57) ABSTRACT

Various electric balance vehicles are described. In some embodiments, the vehicle has first and second housings with platforms to support a user's feet. The first and second housings can be rotatable relative to each other. The vehicle can have first and second wheel assemblies. A support member can extend within tapered portions of the first and second housings. In some embodiments, one of the first and second housings can rotate relative to the support member and the other of the housings can be rotationally fixed relative to the support member. The vehicle can balance and provide locomotion to the user. The vehicle can be light, compact, and/or have a low center of gravity.

15 Claims, 11 Drawing Sheets

(56) References Cited

U.S. PATENT DOCUMENTS

| | | |
|---|---|---|
| 4,556,997 A | 12/1985 | Takamiya et al. |
| 4,624,469 A | 11/1986 | Bourne, Jr. |
| 4,712,806 A | 12/1987 | Patrin |
| 4,874,055 A | 10/1989 | Beer |
| 4,991,861 A | 2/1991 | Carn et al. |
| 5,011,171 A | 4/1991 | Cook |
| 5,165,711 A | 11/1992 | Tsai |
| D355,148 S | 2/1995 | Orsolini |
| 5,522,568 A | 6/1996 | Kamen et al. |
| 5,571,892 A | 11/1996 | Fuji et al. |
| 5,695,021 A | 12/1997 | Schaffner et al. |
| 5,701,965 A | 12/1997 | Kamen et al. |
| 5,701,968 A | 12/1997 | Wright-Ott et al. |
| 5,775,452 A | 7/1998 | Patmont |
| 5,791,425 A | 8/1998 | Kamen et al. |
| 5,794,730 A | 8/1998 | Kamen |
| 5,848,660 A | 12/1998 | McGreen |
| 5,954,349 A | 9/1999 | Rutzel |
| 5,971,091 A | 10/1999 | Kamen et al. |
| 5,975,225 A | 11/1999 | Kamen et al. |
| 6,050,357 A | 4/2000 | Staelin et al. |
| 6,052,647 A | 4/2000 | Parkinson et al. |
| 6,062,600 A | 5/2000 | Kamen et al. |
| 6,070,494 A | 6/2000 | Horng |
| 6,223,104 B1 | 4/2001 | Kamen et al. |
| D444,184 S | 6/2001 | Kettler |
| 6,273,212 B1 | 8/2001 | Husted et al. |
| 6,288,505 B1 | 9/2001 | Heinzmann et al. |
| 6,302,230 B1 | 10/2001 | Kamen et al. |
| 6,332,103 B1 | 12/2001 | Steenson et al. |
| 6,357,544 B1 | 3/2002 | Kamen et al. |
| 6,367,817 B1 | 4/2002 | Kamen et al. |
| 6,386,576 B1 | 5/2002 | Kamen et al. |
| 6,405,816 B1 | 6/2002 | Kamen et al. |
| 6,408,240 B1 | 6/2002 | Morrell et al. |
| 6,415,879 B2 | 7/2002 | Kamen et al. |
| 6,435,535 B1 | 8/2002 | Field et al. |
| 6,443,250 B1 | 9/2002 | Kamen et al. |
| 6,538,411 B1 | 3/2003 | Field et al. |
| 6,543,564 B1 | 4/2003 | Kamen et al. |
| 6,547,026 B2 | 4/2003 | Kamen et al. |
| 6,553,271 B1 | 4/2003 | Morrell |
| 6,561,294 B1 | 5/2003 | Kamen et al. |
| 6,575,539 B2 | 6/2003 | Reich |
| 6,581,714 B1 | 6/2003 | Kamen et al. |
| 6,598,941 B2 | 7/2003 | Field et al. |
| 6,651,763 B1 | 11/2003 | Kamen et al. |
| 6,651,766 B2 | 11/2003 | Kamen et al. |
| D489,027 S | 4/2004 | Waters |
| D489,029 S | 4/2004 | Waters |
| 6,715,845 B2 | 4/2004 | Kamen et al. |
| D489,300 S | 5/2004 | Chang et al. |
| D493,127 S | 7/2004 | Waters et al. |
| D493,128 S | 7/2004 | Waters et al. |
| D493,129 S | 7/2004 | Waters et al. |
| D493,392 S | 7/2004 | Waters et al. |
| D494,099 S | 8/2004 | Maurer et al. |
| 6,779,621 B2 | 8/2004 | Kamen et al. |
| 6,789,640 B1 | 9/2004 | Arling et al. |
| 6,796,396 B2 | 9/2004 | Kamen et al. |
| 6,799,649 B2 | 10/2004 | Kamen et al. |
| 6,815,919 B2 | 11/2004 | Field et al. |
| 6,827,163 B2 | 12/2004 | Amsbury et al. |
| 6,837,327 B2 | 1/2005 | Heinzmann |
| 6,866,107 B2 | 3/2005 | Heinzmann et al. |
| 6,868,931 B2 | 3/2005 | Morrell et al. |
| 6,874,591 B2 | 4/2005 | Morrell et al. |
| 6,889,784 B2 | 5/2005 | Troll |
| 6,907,949 B1 | 6/2005 | Wang |
| D507,206 S | 7/2005 | Wang |
| 6,920,947 B2 | 7/2005 | Kamen et al. |
| 6,926,294 B2 | 8/2005 | Lewis |
| 6,929,080 B2 | 8/2005 | Kamen et al. |
| 6,965,206 B2 | 11/2005 | Kamen et al. |
| 6,969,079 B2 | 11/2005 | Kamen et al. |
| 6,979,003 B2 | 12/2005 | Adams |
| 6,992,452 B1 | 1/2006 | Sachs et al. |
| 7,000,933 B2 | 2/2006 | Arling et al. |
| 7,004,271 B1 | 2/2006 | Kamen et al. |
| 7,006,901 B2 | 2/2006 | Wang |
| 7,017,686 B2 | 3/2006 | Kamen et al. |
| 7,023,330 B2 | 4/2006 | Kamen et al. |
| 7,083,178 B2 | 8/2006 | Potter |
| 7,090,040 B2 | 8/2006 | Kamen et al. |
| 7,091,724 B2 | 8/2006 | Heinzmann et al. |
| D528,468 S | 9/2006 | Arling et al. |
| 7,130,702 B2 | 10/2006 | Morrell |
| 7,131,706 B2 | 11/2006 | Kamen et al. |
| 7,157,875 B2 | 1/2007 | Kamen et al. |
| 7,174,976 B2 | 2/2007 | Kamen et al. |
| 7,178,614 B2 | 2/2007 | Ishii |
| 7,182,166 B2 | 2/2007 | Gray et al. |
| 7,195,259 B2 | 3/2007 | Gang |
| 7,210,544 B2 | 5/2007 | Kamen et al. |
| 7,243,572 B1 | 7/2007 | Arling et al. |
| 7,263,453 B1 | 8/2007 | Gansler et al. |
| D551,592 S | 9/2007 | Chang et al. |
| D551,722 S | 9/2007 | Chang et al. |
| 7,273,116 B2 | 9/2007 | Kamen et al. |
| 7,275,607 B2 | 10/2007 | Kamen et al. |
| 7,303,032 B2 | 12/2007 | Kahlert et al. |
| 7,338,056 B2 | 3/2008 | Chen et al. |
| 7,357,202 B2 | 4/2008 | Kamen et al. |
| 7,363,993 B2 | 4/2008 | Ishii |
| 7,367,572 B2 | 5/2008 | Jiang |
| 7,370,713 B1 | 5/2008 | Kamen |
| 7,407,175 B2 | 8/2008 | Kamen et al. |
| 7,424,927 B2 | 9/2008 | Hiramatsu |
| 7,437,202 B2 | 10/2008 | Morrell |
| 7,467,681 B2 | 12/2008 | Hiramatsu |
| 7,469,760 B2 | 12/2008 | Kamen et al. |
| 7,479,872 B2 | 1/2009 | Kamen et al. |
| 7,481,291 B2 | 1/2009 | Nishikawa |
| 7,546,889 B2 | 6/2009 | Kamen et al. |
| 7,587,334 B2 | 9/2009 | Walker et al. |
| 7,592,900 B2 | 9/2009 | Kamen et al. |
| D601,922 S | 10/2009 | Imai et al. |
| 7,597,334 B2 | 10/2009 | Chen |
| 7,643,834 B2 | 1/2010 | Ioppe et al. |
| 7,681,895 B2 | 3/2010 | Chen |
| 7,690,447 B2 | 4/2010 | Kamen et al. |
| 7,690,452 B2 | 4/2010 | Kamen et al. |
| 7,703,568 B2 | 4/2010 | Ishii |
| 7,708,094 B2 | 5/2010 | Kamen et al. |
| 7,717,439 B2 | 5/2010 | Chen |
| 7,740,099 B2 | 6/2010 | Field et al. |
| 7,757,794 B2 | 7/2010 | Heinzmann |
| 7,766,351 B2 | 8/2010 | Chen et al. |
| 7,775,534 B2 | 8/2010 | Chen et al. |
| 7,779,939 B2 | 8/2010 | Kamen et al. |
| 7,783,392 B2 | 8/2010 | Oikawa |
| 7,789,174 B2 | 9/2010 | Kamen et al. |
| 7,812,715 B2 | 10/2010 | Kamen et al. |
| 7,857,088 B2 | 12/2010 | Field et al. |
| 7,866,429 B2 | 1/2011 | Ishii et al. |
| 7,891,680 B2 | 2/2011 | Chen et al. |
| 7,900,725 B2 | 3/2011 | Heinzmann et al. |
| 7,938,207 B2 | 5/2011 | Kamen et al. |
| 7,950,123 B2 | 5/2011 | Arling et al. |
| 7,958,956 B2 | 6/2011 | Kakinuma et al. |
| 7,962,256 B2 | 6/2011 | Sterns et al. |
| 7,979,179 B2 | 7/2011 | Gansler |
| 7,980,568 B2 | 7/2011 | Chen |
| 8,014,923 B2 | 9/2011 | Ishii et al. |
| 8,016,060 B2 | 9/2011 | Miki et al. |
| 8,028,777 B2 | 10/2011 | Kakinuma et al. |
| 8,047,556 B2 | 11/2011 | Jang et al. |
| 8,073,575 B2 | 12/2011 | Tachibana et al. |
| 8,074,388 B2 | 12/2011 | Trainer |
| 8,091,672 B2 | 1/2012 | Gutsch et al. |
| 8,113,524 B2 | 2/2012 | Karpman |
| 8,146,696 B2 | 4/2012 | Kaufman |
| 8,157,274 B2 | 4/2012 | Chen |
| 8,162,089 B2 | 4/2012 | Shaw |

(56) References Cited

U.S. PATENT DOCUMENTS

| | | |
|---|---|---|
| 8,165,771 B2 | 4/2012 | Doi |
| 8,170,780 B2 | 5/2012 | Field et al. |
| 8,186,462 B2 | 5/2012 | Kamen et al. |
| 8,225,891 B2 | 7/2012 | Takenaka et al. |
| 8,248,222 B2 | 8/2012 | Kamen et al. |
| 8,271,185 B2 | 9/2012 | Doi |
| 8,285,474 B2 | 10/2012 | Doi |
| 8,301,354 B2 | 10/2012 | Doi |
| 8,322,477 B2 | 12/2012 | Kamen et al. |
| 8,381,847 B2 | 2/2013 | Polutnik |
| 8,408,565 B2 | 4/2013 | An |
| 8,417,404 B2 | 4/2013 | Yen et al. |
| 8,453,340 B2 | 6/2013 | Van der Merwe et al. |
| 8,453,768 B2 | 6/2013 | Kamen et al. |
| 8,459,667 B2 | 6/2013 | Ungar et al. |
| 8,459,668 B2 | 6/2013 | Yoon |
| 8,467,941 B2 | 6/2013 | Field et al. |
| 8,469,376 B2 | 6/2013 | Kristiansen |
| 8,490,723 B2 | 7/2013 | Heinzmann et al. |
| 8,532,877 B2 | 9/2013 | Oikawa |
| 8,579,769 B2 | 11/2013 | Sans |
| 8,584,782 B2 | 11/2013 | Chen |
| 8,606,468 B2 | 12/2013 | Kosaka |
| 8,616,313 B2 | 12/2013 | Simeray et al. |
| 8,684,123 B2 | 4/2014 | Chen |
| 8,688,303 B2 | 4/2014 | Stevens et al. |
| 8,738,278 B2 | 5/2014 | Chen |
| 8,763,733 B2 | 7/2014 | Hamaya et al. |
| 8,807,250 B2 | 8/2014 | Chen |
| 8,830,048 B2 | 9/2014 | Kamen et al. |
| 8,860,362 B2 | 10/2014 | Kamen et al. |
| 8,960,353 B2 | 2/2015 | Chen |
| 8,978,791 B2 | 3/2015 | Ha et al. |
| 9,045,190 B2 | 6/2015 | Chen |
| 9,101,817 B2 | 8/2015 | Doerksen |
| D737,723 S | 9/2015 | Ying et al. |
| D738,256 S | 9/2015 | Ying et al. |
| D739,906 S | 9/2015 | Chen |
| 9,239,158 B2 | 1/2016 | Rothschilld |
| 9,376,155 B2 | 6/2016 | Ying et al. |
| 9,403,573 B1 | 8/2016 | Mazzei |
| 9,434,438 B1 | 9/2016 | Kim et al. |
| 9,452,802 B2 | 9/2016 | Ying et al. |
| D778,782 S | 2/2017 | Chen et al. |
| D779,375 S | 2/2017 | Zeng |
| D780,626 S | 3/2017 | Li et al. |
| 9,604,692 B1 | 3/2017 | Kim |
| D783,452 S | 4/2017 | Ying |
| D783,751 S | 4/2017 | Yao |
| D784,195 S | 4/2017 | Ying |
| D784,196 S | 4/2017 | Ying |
| D784,197 S | 4/2017 | Ying |
| D784,198 S | 4/2017 | Zhu |
| D785,112 S | 4/2017 | Ying |
| D785,113 S | 4/2017 | Ying |
| D785,114 S | 4/2017 | Ying |
| D785,115 S | 4/2017 | Ying |
| D785,736 S | 5/2017 | Ying |
| D786,130 S | 5/2017 | Huang |
| D786,994 S | 5/2017 | Chen |
| 9,638,285 B2 | 5/2017 | Huang |
| 9,656,713 B1 | 5/2017 | Ryan et al. |
| 9,688,340 B1 | 6/2017 | Kroymann |
| 9,745,013 B2 | 8/2017 | Wood |
| D803,722 S | 11/2017 | Ying |
| D803,963 S | 11/2017 | Desberg |
| D805,429 S | 12/2017 | Cao |
| 9,840,302 B2 | 12/2017 | Zeng |
| D807,457 S | 1/2018 | Desberg |
| D808,300 S | 1/2018 | Cao |
| D808,855 S | 1/2018 | Zhang et al. |
| D808,856 S | 1/2018 | Zhang et al. |
| D808,857 S | 1/2018 | Zhang |
| D810,618 S | 2/2018 | Li |
| D812,521 S | 3/2018 | Yao |
| D817,811 S | 5/2018 | Wang et al. |
| RE46,964 E | 7/2018 | Chen |
| 10,059,397 B2 | 8/2018 | Ying et al. |
| 10,144,477 B2 | 12/2018 | Lankford et al. |
| D837,322 S | 1/2019 | Desberg |
| D837,323 S | 1/2019 | Desberg |
| D840,872 S | 2/2019 | Desberg |
| D850,326 S | 6/2019 | Zheng |
| D852,891 S | 7/2019 | Yao |
| D865,095 S | 10/2019 | Desberg |
| D865,890 S | 11/2019 | Desberg |
| D899,540 S | 10/2020 | Desberg |
| D899,541 S | 10/2020 | Desberg |
| D928,264 S | 8/2021 | Ke et al. |
| 11,130,543 B2 | 9/2021 | Ying |
| 11,141,647 B2 | 10/2021 | Li |
| D941,948 S | 1/2022 | Desberg |
| D944,349 S | 2/2022 | Zhao |
| D958,278 S | 7/2022 | Desberg |
| D960,043 S | 8/2022 | Desberg |
| 11,654,995 B2 | 5/2023 | Desberg et al. |
| RE49,608 E | 8/2023 | Chen |
| D1,002,764 S | 10/2023 | Desberg |
| D1,013,080 S | 1/2024 | Desberg |
| 2002/0008361 A1 | 1/2002 | Smith |
| 2002/0063006 A1 | 5/2002 | Kamen et al. |
| 2002/0149172 A1 | 10/2002 | Field et al. |
| 2003/0155167 A1 | 8/2003 | Kamen et al. |
| 2004/0005958 A1 | 1/2004 | Kamen et al. |
| 2004/0007399 A1 | 1/2004 | Heinzmann et al. |
| 2004/0007644 A1 | 1/2004 | Phelps, III et al. |
| 2004/0055796 A1 | 1/2004 | Heinzmann et al. |
| 2004/0050611 A1 | 3/2004 | Kamen et al. |
| 2004/0201271 A1 | 10/2004 | Kakinuma et al. |
| 2004/0262871 A1 | 12/2004 | Schreuder et al. |
| 2005/0126832 A1 | 6/2005 | Amsbury et al. |
| 2005/0134014 A1 | 6/2005 | Xie |
| 2006/0202439 A1 | 9/2006 | Kahlert et al. |
| 2006/0226675 A1 | 10/2006 | Dunn |
| 2006/0260857 A1 | 11/2006 | Kakinuma et al. |
| 2007/0051543 A1 | 3/2007 | Kamen et al. |
| 2007/0158117 A1 | 7/2007 | Alexander |
| 2007/0273118 A1 | 11/2007 | Conrad |
| 2008/0105471 A1 | 1/2008 | Nakashima et al. |
| 2008/0029985 A1 | 2/2008 | Chen |
| 2008/0147281 A1 | 6/2008 | Ishii et al. |
| 2008/0284130 A1 | 11/2008 | Kamen et al. |
| 2009/0032323 A1 | 2/2009 | Kakinuma et al. |
| 2009/0055033 A1 | 2/2009 | Gansler et al. |
| 2009/0078485 A1 | 3/2009 | Gutsch et al. |
| 2009/0105908 A1 | 4/2009 | Casey et al. |
| 2009/0115149 A1 | 5/2009 | Wallis et al. |
| 2009/0200746 A1 | 8/2009 | Yamamoto |
| 2009/0315293 A1 | 12/2009 | Kosaka |
| 2010/0025139 A1 | 2/2010 | Kosaka et al. |
| 2010/0033315 A1 | 2/2010 | Kamen et al. |
| 2010/0114468 A1 | 5/2010 | Field et al. |
| 2010/0121538 A1 | 5/2010 | Ishii et al. |
| 2010/0168993 A1 | 7/2010 | Doi et al. |
| 2010/0207564 A1 | 8/2010 | Robinson |
| 2010/0217497 A1 | 8/2010 | Kamen et al. |
| 2010/0222994 A1 | 9/2010 | Field et al. |
| 2010/0225080 A1 | 9/2010 | Smith |
| 2010/0237645 A1 | 9/2010 | Trainer |
| 2011/0023652 A1 | 2/2011 | Cosby et al. |
| 2011/0131759 A1 | 6/2011 | An |
| 2011/0209929 A1 | 9/2011 | Heinzmann et al. |
| 2011/0220427 A1 | 9/2011 | Chen |
| 2011/0221160 A1 | 9/2011 | Shaw et al. |
| 2011/0238247 A1 | 9/2011 | Yen et al. |
| 2011/0282532 A1 | 11/2011 | Kosaka et al. |
| 2012/0035809 A1 | 2/2012 | Kosaka |
| 2012/0205176 A1 | 8/2012 | Ha et al. |
| 2012/0239284 A1 | 9/2012 | Field et al. |
| 2012/0290162 A1 | 11/2012 | Stevens et al. |
| 2012/0310464 A1 | 12/2012 | Kamen et al. |
| 2013/0010825 A1 | 1/2013 | Kamen et al. |
| 2013/0032422 A1 | 2/2013 | Chen |
| 2013/0032423 A1 | 2/2013 | Chen |

(56) References Cited

U.S. PATENT DOCUMENTS

| | | |
|---|---|---|
| 2013/0092461 A1 | 4/2013 | Kamen et al. |
| 2013/0099565 A1 | 4/2013 | Sachs et al. |
| 2013/0105239 A1 | 5/2013 | Fung |
| 2013/0186702 A1 | 7/2013 | Hadley et al. |
| 2013/0206493 A1 | 8/2013 | Larson et al. |
| 2013/0228385 A1 | 9/2013 | Chen |
| 2013/0238231 A1 | 9/2013 | Chen |
| 2013/0268145 A1 | 10/2013 | Kamen et al. |
| 2014/0091622 A1 | 4/2014 | Lucas et al. |
| 2014/0163855 A1 | 6/2014 | Field et al. |
| 2014/0188316 A1 | 7/2014 | Heinzmann et al. |
| 2014/0222267 A1 | 8/2014 | Stevens et al. |
| 2014/0339003 A1 | 11/2014 | Kamen et al. |
| 2015/0066276 A1 | 3/2015 | Nakashima et al. |
| 2015/0096820 A1 | 4/2015 | Strack |
| 2015/0175202 A1 | 6/2015 | MacGregor et al. |
| 2016/0121198 A1 | 5/2016 | Doerksen et al. |
| 2016/0129963 A1 | 5/2016 | Ying et al. |
| 2016/0185411 A1 | 6/2016 | Hadley et al. |
| 2016/0207584 A1 | 7/2016 | Ying et al. |
| 2016/0325803 A1 | 11/2016 | Waxman |
| 2017/0088211 A1 | 3/2017 | Jiang |
| 2017/0088212 A1 | 3/2017 | Edney |
| 2017/0106931 A1 | 4/2017 | Wood |
| 2017/0144718 A1 | 5/2017 | Tinaphong |
| 2017/0158275 A1 | 6/2017 | Yang |
| 2017/0166278 A1 | 6/2017 | Lu |
| 2017/0183053 A1 | 6/2017 | Zeng |
| 2017/0217529 A1 | 8/2017 | Chen |
| 2017/0253287 A1 | 9/2017 | Zuo |
| 2017/0297653 A1 | 10/2017 | Zheng |
| 2017/0349230 A1 | 12/2017 | Doerksen et al. |
| 2018/0037290 A1 | 2/2018 | Ying |
| 2018/0037293 A1 | 2/2018 | Chen |
| 2018/0273130 A1 | 9/2018 | Ying |
| 2019/0077479 A1 | 3/2019 | Chen |
| 2019/0256164 A1 | 8/2019 | Yang et al. |

FOREIGN PATENT DOCUMENTS

| | | |
|---|---|---|
| CN | 101148184 A | 3/2008 |
| CN | 101157376 A | 4/2008 |
| CN | 100431906 C | 11/2008 |
| CN | 101353070 A | 1/2009 |
| CN | 201205442 Y | 3/2009 |
| CN | 201283206 Y | 8/2009 |
| CN | 201350326 Y | 11/2009 |
| CN | 201419008 Y | 3/2010 |
| CN | 201423155 Y | 3/2010 |
| CN | 201431762 Y | 3/2010 |
| CN | 101920728 A | 12/2010 |
| CN | 101565073 B | 1/2011 |
| CN | 201824899 U | 5/2011 |
| CN | 101513569 B | 7/2011 |
| CN | 301604610 S | 7/2011 |
| CN | 201978449 U | 9/2011 |
| CN | 202201103 U | 4/2012 |
| CN | 102514662 A | 6/2012 |
| CN | 102602481 A | 7/2012 |
| CN | 102616310 A | 8/2012 |
| CN | 103144715 A | 6/2013 |
| CN | 103246288 A | 8/2013 |
| CN | 203158157 U | 8/2013 |
| CN | 203381739 U | 1/2014 |
| CN | 104014123 A | 9/2014 |
| CN | 104029769 A | 9/2014 |
| CN | 203844875 U | 9/2014 |
| CN | 203996649 U | 12/2014 |
| CN | 204050913 U | 12/2014 |
| CN | 102514662 B | 4/2015 |
| CN | 102514663 B | 5/2015 |
| CN | 104859773 A | 8/2015 |
| CN | 104922891 A | 9/2015 |
| CN | 104922893 A | 9/2015 |
| CN | 104954476 A | 9/2015 |
| CN | 204699363 U | 10/2015 |
| CN | 105109595 A | 12/2015 |
| CN | 105151181 A | 12/2015 |
| CN | 105172959 A | 12/2015 |
| CN | 204864865 U | 12/2015 |
| CN | 204915961 U | 12/2015 |
| CN | 204952213 U | 1/2016 |
| CN | 205005082 U | 1/2016 |
| CN | 105329386 A | 2/2016 |
| CN | 105329387 A | 2/2016 |
| CN | 105329388 A | 2/2016 |
| CN | 105346606 A | 2/2016 |
| CN | 105346607 A | 2/2016 |
| CN | 105346643 A | 2/2016 |
| CN | 105346649 A | 2/2016 |
| CN | 105346650 A | 2/2016 |
| CN | 105346651 A | 2/2016 |
| CN | 105365963 A | 3/2016 |
| CN | 105416464 A | 3/2016 |
| CN | 105416468 A | 3/2016 |
| CN | 105416484 A | 3/2016 |
| CN | 105416485 A | 3/2016 |
| CN | 105416486 A | 3/2016 |
| CN | 205150007 U | 4/2016 |
| CN | 205150114 U | 4/2016 |
| CN | 205160428 U | 4/2016 |
| CN | 205186320 U | 4/2016 |
| CN | 205186321 U | 4/2016 |
| CN | 205186322 U | 4/2016 |
| CN | 105539659 A | 5/2016 |
| CN | 105539664 A | 5/2016 |
| CN | 105539665 A | 5/2016 |
| CN | 105539666 A | 5/2016 |
| CN | 105539695 A | 5/2016 |
| CN | 205256547 U | 5/2016 |
| CN | 105730576 A | 7/2016 |
| CN | 105905205 A | 8/2016 |
| CN | 205469471 U | 8/2016 |
| CN | 205554418 U | 9/2016 |
| CN | 205906129 U | 1/2017 |
| CN | 206344927 U | 7/2017 |
| CN | 107512347 A | 12/2017 |
| DE | 3411489 | 10/1984 |
| DE | 44 04 594 | 8/1995 |
| DE | 19642333 A1 | 4/1998 |
| DE | 10209093 | 9/2003 |
| DE | 202014010564 U1 | 1/2016 |
| EP | 1791609 B1 | 11/2011 |
| EP | 2987712 A1 | 2/2016 |
| GB | 2529565 A | 2/2016 |
| JP | 52-044933 | 4/1977 |
| JP | 57-87766 | 6/1982 |
| JP | 57-110569 | 7/1982 |
| JP | 59-73372 | 4/1984 |
| JP | 61-31685 | 2/1986 |
| JP | 62-12810 | 1/1987 |
| JP | 63-305082 | 6/1987 |
| JP | 2-190277 | 7/1990 |
| JP | 4-201793 | 7/1992 |
| JP | 5-213240 | 8/1993 |
| JP | 6-105415 | 4/1994 |
| JP | 6-171562 | 6/1994 |
| JP | 10-023613 | 1/1998 |
| JP | H03-070015 | 5/2000 |
| JP | 2001-178863 A | 7/2001 |
| JP | 2004-359094 A | 12/2004 |
| JP | 2005-094898 A | 4/2005 |
| JP | 2005-335471 A | 12/2005 |
| JP | 2006-001384 A | 1/2006 |
| JP | 2006-001385 A | 1/2006 |
| JP | 2006-008013 A | 1/2006 |
| JP | 2010-030436 A | 2/2010 |
| JP | 2010-030437 A | 2/2010 |
| JP | 2010-030438 A | 2/2010 |
| JP | 2010-030568 A | 2/2010 |
| JP | 2010-030569 A | 2/2010 |
| JP | 2010-035330 A | 2/2010 |
| JP | 2010-254216 A | 11/2010 |
| JP | 2011-131620 A | 7/2011 |

(56) References Cited

FOREIGN PATENT DOCUMENTS

| | | |
|---|---|---|
| JP | 2016-527115 A | 9/2016 |
| JP | 6086636 B1 | 3/2017 |
| KR | 10-2008-0062416 A | 7/2008 |
| TW | M516550 U | 2/2016 |
| TW | M531423 U | 11/2016 |
| WO | WO 86/05752 | 10/1986 |
| WO | WO 89/06117 | 7/1989 |
| WO | WO 96/23478 | 8/1996 |
| WO | WO 98/46474 | 10/1998 |
| WO | WO 00/75001 | 12/2000 |
| WO | WO 2003/68342 | 2/2003 |
| WO | WO 2004/07264 | 1/2004 |
| WO | WO 2004/108513 A1 | 12/2004 |
| WO | WO 2009/120157 A1 | 10/2009 |
| WO | WO 2015/188599 A1 | 12/2015 |
| WO | WO 2017/092101 A1 | 6/2017 |
| WO | WO 2017/092163 | 8/2017 |
| WO | WO 2017/210830 A1 | 12/2017 |

OTHER PUBLICATIONS

Office Action in corresponding European Patent Application No. 18890822.2, dated Jul. 5, 2023, in 9 pages.

Office Action in corresponding Japanese Patent Application No. 2020-534199, dated May 22, 2023, in 20 pages.

International Preliminary Report on Patentability in co-pending Application No. PCT/US2018/067324, issued Jun. 23, 2020, in 7 pages.

International Search Report and Written Opinion in co-pending Application No. PCT/US18/67324, mailed Mar. 27, 2019, in 12 pages.

Office Action in corresponding Japanese Patent Application No. 2020-534199, dated Aug. 29, 2022, in 20 pages.

Abeygunawardhana, et al., Vibration Suppression of Two-Wheel Mobile Manipulator Using Resonance-Ratio-Control-Based NullSpace Control, IEEE Transactions on Industrial Electronics, vol. 57, No. 12, pp. 4137-4146 (2010).

Azizan, et al., Fuzzy Control Based on LMI Approach and Fuzzy Interpretation of the Rider Input for Two Wheeled Balancing Human Transporter, 2010 8th IEEE International Conference on Control and Automation, Xiamen, 2010, pp. 192-197.

Banks, Alex, Everything You Need to Know About the Hoverboard Craze, highsnobiety.com, Oct. 14, 2015, http://www.highsnobiety.com/2015/10/14/hoverboard-history.

Bash, John D., How Do Self Balancing Scooters Work?, bestelectrichoverboard.com (Nov. 12, 2015), https://bestelectrichoverboard.com/hoverboard-faq/how-do-selfbalancing-scooters-work/.

Blankespoor, et al., Experimental Verification of the Dynamic Model for a Quarter Size Self-Balancing Wheelchair, Proceeding of the 2004 American Control Conference, Boston, MA, vol. 1, pp. 488-492.

Cardozo, et al., Prototype for a Self-Balanced Personal Transporter, 2012 Workshop on Engineering Applications (WEA), Bogota, 2012, pp. 1-6.

Chiu, et al., Design and implement of the self-dynamic controller for two-wheel transporter, 2006 IEEE International Conference on Fuzzy Systems, Vancouver, BC, 2006, pp. 480-483.

Choi, et al., Four and Two Wheel Transformable Dynamic Mobile Platform, 2011 IEEE International Conference on Robotics and Automation (ICRA), Shanghai, pp. 1-4.

Clark, et al. "Edgar, a Self-Balancing Scooter Final Report" (2005). (Divided in to 2 parts for submission).

CNET, Screenshots of "First look at the Razor Hovertrax 2.0 with Jake Krol" video, posted on Jul. 13, 2016, in 28 pages.

Coelho, et al., Development of a Mobile Two-Wheel Balancing Platform for Autonomous Applications, 15th International conference on Mechatronics and Machine Vision in Practice, Auckland, 2008, pp. 575-580.

Detrick, Ben, Celebrities on Scooters (Catch Them If You Can), The New York Times Aug. 15, 2015, http://www.nytimes.com/2015/08/16/fashion/cara-delevingne-justinbieber-meek-mill-stephen-curry-on-scooters.html ?_r=%200.

Gotoh, Akio and Yamaoka, Masaaki, "Personal Mobility Robot," Robot, Issue No. 199, Mar. 2011, pp. 28-31.

Hornyak, Tim, Robot roller skates less bulky than Segway, www.cnet.com, Nov. 27, 2009.

Hu, et al., Self-balancing Control and Manipulation of a Glove Puppet Robot on a Two-Wheel Mobile Platform, 2009 IEEE/RSJ International Conference on intelligent Robots and Systems, St. Louis, MO, 2009, pp. 424-425.

Inventist, Inc. "Hovertrax Guide and Manual," 2014, in 15 pages.

"Inventist Inc., Solo Wheel, Orbit wheel @ Toy Fair 2013" https://www.youtube.com/watch?v=w8rHKCjLAWI, Feb. 10, 2013.

IO Hawk—Intelligent Personal Mobility Device, https://web.archive.org/web/20150718144409/http://iohawk.com, Jul. 18, 2015, in 9 pages.

Kantrowitz, Alex, Everything You Need to Know About the Hoverboard Craze, buzzfeed.com Aug. 27, 2015, https://www.buzzfeed.com/alexkantrowitz/a-crash-course-inhoverboards?utm_term=.qw5Z9x47Z#.oc1W1v56W.

Kawaji, S., Stabilization of Unicycle Using Spinning Motion, Denki Gakkai Ronbushi, D, vol. 107, Issue 1, Japan (1987), pp. 21-28.

Kickstarter, Comments on Hovertrax by Inventist, https://www.kickstarter.com/projects/687658339/hovertax/comments, apparently available Oct. 2014, in 16 pages.

Kickstarter, "Hovertrax by Inventist," https://web.archive.org/web/20130504083823/http://kickstarter.com/projects/687658339/hovertrax?, May 4, 2013, in 11 pages.

Kim, et al., Development of a Two-Wheeled Mobile Tilting & Balancing (MTB) Robot, 2011 11th International Conference on Control, Automation and Systems (ICCAS), Gyeonggi-do, 2011, pp. 1-6.

Li, et al., A coaxial couple wheeled equilibrium robot with T-S fuzzy equilibrium control, Industrial Robot: An International Journal, vol. 38, Issue 3, pp. 292-300, 2011.

Li, et al., Controller Design of a Two-Wheeled Inverted Pendulum Mobile Robot, 2008 IEEE International Conference on Mechatronics and Automation, Takarnatsu, pp. 7-12.

Li, et al., Mechanical Design and Dynamic Modeling of a TwoWheeled Inverted Pendulum Mobile Robot, Proceedings of the 2007 IEEE International Conference on Automation and Logistics, Jinan, 2007, pp. 1614-1619.

Lin, et al., Adaptive Robust Self-Balancing and Steering of a Two-Wheeled Human Transportation Vehicle, 62 J Intell Robot Syst, pp. 103-123 (2011) (first published online Aug. 27, 2010).

Murphy, Mike, Everything You've Ever Wanted to Know About the Hoverboard Craze, Quartz Nov. 11, 2015, http://qz.com/495935/everything-youve-ever-wanted-to-know-aboutthe-hoverboard-craze/.

Quick, Darren, Nissan Joins Personal Mobility Field with "Segwayskis", http:///www.gizmag.corn/nissan-personal-mobility-device/13210/, New Atlas, Urban Transport, Oct. 27, 2009, pp. 1-9.

Quirk, Trevor, "Why you shouldn't expect a hoverboard any time soon," Christian Science Monitor, URL~https://www.csmonitor.com/Science/2012/0213/Why-you-shouldn-t-expect-a-hoverboardany-time-soon, Feb. 13, 2012, Web. Jul. 5, 2016, pp. 1-5.

Robinson, Mandy, Hoverboard Black Friday Sales: Best Places to Get One Before Christmas, inquisitr.com, Nov. 24, 2015, http://www.inquisitr.com/2589773/hoverboard-black-friday-sales-best-10107994 - iv - places-to-get-one-before-christmas/.

Sasaki, et al., Forward and Backward Motion Control of Personal Riding-type Wheeled Mobile Platform, Proceedings of the 2004 IEEE International Conference on Robotics and Automation, vol. 4, pp. 3331-3336.

Sasaki, Makiko, et al., "Steering Control of the Personal Riding-type Wheeled Mobile Platform (PMP)," vol. 4 of 4, IEEE, RSJ International Conference on Intelligent Robots and Systems, Aug. 2-6, 2005, in 60 pages.

Schoonwinkel, A., Design and Test of a Computer-Stabilized Unicycle, Stanford University (1988), UMI Dissertation Services.

(56) References Cited

OTHER PUBLICATIONS

Seo, et al., Simulation of Attitude Control of a Wheeled Inverted Pendulum, International Conference on Control, Automation, and Systems, 2007, Seoul, pp. 2264-2269.

Sino US Times, Interview of Mr. Ying, http://www.chic-robot.com/index.php/news/info/54, Jan. 26, 2016, in 15 pages.

They're Completely Different Products': IO Hawk President John Soibatian Not Concerned About Infringing Hovertrax Patent, hoverguru.com (2015), http://hoverguru.com/posts/theyrecompletely-different-products-io-hawk-president-john-soibatian-notconcerned-about-infringing-on-hovertrax-patent/ (last visited Dec. 27, 2016).

Tran, Long, "More Weird Ways to Skate the Streets," Yanko Design, Sep. 7, 2007.

Tsai, et al., Development of a Self-Balancing Human Transportation Vehicle for the Teaching of Feedback Control, IEEE Transactions on Education, vol. 52, No. 1, Feb. 2009.

Tsai, et al., Intelligent Adaptive Motion Control Using Fuzzy Basis Function Networks for Self-Balancing Two-Wheeled Transporters, 2010 IEEE Conference on Fuzzy Systems, Barcelona, 2010 pp. 1-6.

Vos, D., Dynamics and Nonlinear Adaptive Control of an Autonomous Unicycle, Massachusetts Institute of Technology, 1989.

Vos, D., Nonlinear Control of an Autonomous Unicycle Robot: Practical Issues, Massachusetts Institute of Technology, 1992.

Wells, Georgia, What It's Like to Have Wheels for Feet: Test Driving the Latest 'Hoverboards', The Wall Street Journal (Oct. 28, 2015), http://www.wsj.com/articles/what-its-like-to-have-wheels-forfeet-test-driving-the-latest-hoverboards-1446055640.

Office Action in corresponding Japanese Patent Application No. 2020-534199, dated Jan. 29, 2024, in 15 pages.

Hovertrax by Inventist, https://web.archive.org/web/20130504083823/http:/www.kickstarter.com/projects/687658339/hovertrax, May 4, 2013, in 11 pages.

Yu, et al., Development of a Omni-directional Self-Balancing Robot Wheelchair, Journal of Korea Robotics Society, vol. 8, Iss. 4, pp. 229-237 (2013).

ELECTRIC BALANCE VEHICLES

CROSS REFERENCE

Any and all applications for which a foreign or domestic priority claim is identified in the Application Data Sheet as filed with the present application are hereby incorporated by reference under 37 CFR 1.57. The present application claims priority to U.S. patent application Ser. No. 16/230,873, filed Dec. 21, 2018, now U.S. Pat. No. 11,654,995, which claims the benefit of U.S. Provisional Application No. 62/610,103, filed Dec. 22, 2017, U.S. Provisional Application No. 62/628,789, filed Feb. 9, 2018, and U.S. Provisional Application No. 62/629,884, filed Feb. 13, 2018, the entireties of each of which are hereby incorporated by reference herein.

BACKGROUND

Field

This disclosure relates to personal mobility vehicles, such as two-wheeled electric balance vehicles.

Certain Related Art

An electric balance vehicle is also known as a self-balancing scooter or "hoverboard." Electric balance vehicles can provide a portable, stowable, and environmentally friendly means of transport and entertainment.

SUMMARY OF CERTAIN FEATURES

Various electric balance vehicles are described in this disclosure. In some embodiments, the vehicle can include a first foot placement section and a second foot placement section. The first foot placement section can include a first housing and a first wheel assembly. The second foot placement section can include a second housing and a second wheel assembly. The first wheel assembly can include a first wheel, a first motor positioned within the first wheel, and a first axle extending from the first wheel. The second wheel assembly can include a second wheel, a second motor positioned within the second wheel, and a second axle extending from the second wheel. In some embodiments, the vehicle can include a connection member. The connection member can have a first end and a second end. The first end of the connection member can be positioned within the first housing and the second end of the connection member can be positioned within the second housing. In some embodiments, the first housing can include a first gap between the first end of the connection member and the first wheel assembly. In some embodiments, the second housing can include a second gap between the second end of the connection member and the second wheel assembly.

In some embodiments, the vehicle can include a first housing and a second housing. Each of the first and second housings can be configured to support a respective foot of a user. The second housing can be rotatable relative to the first housing. In some embodiments, the vehicle can include a first wheel assembly and a second wheel assembly. The first wheel assembly can include a first wheel, a first motor positioned within the first wheel, and a first axle extending from the first wheel. The second wheel assembly can include a second wheel, a second motor positioned within the second wheel, and a second axle extending from the second wheel. In some embodiments, the vehicle can include a support member connecting the first and second housings. In some embodiments, the vehicle can include a first controller for controlling the first wheel assembly and a second controller for controlling the second wheel assembly. In some embodiments, the vehicle can include a battery for supplying power to the first and second controllers and the first and second motors. In some embodiments, the vehicle can include a first sensor and a second sensor. The first sensor can be provided in the first housing. The second sensor can be provided in the second housing. The first sensor can be configured to sense rotation of the first housing and generate a first sensing signal. The second sensor can be configured to sense rotation of the second housing and generate a second sensing signal. In some embodiments, the battery and the first controller can be disposed to a first lateral side of the support member, between the support member and the first axle. In some embodiments, the second controller can be disposed to a second lateral side of the support member, between the support member and the second axle.

According to some embodiments, the first gap can have a first length, the second gap can have a second length, and the first length can be greater than the second length. The first gap can define a space between the first end of the connection member and the first axle. The second gap can define a space between the second end of the connection member and the second axle.

According to some embodiments, the vehicle can include a battery and a controller fixed within the first gap in the first housing.

According to some embodiments, the first housing can be rotatable relative to the second housing.

According to some embodiments, the connection member connects the first and second housings.

According to some embodiments, the vehicle can include a first controller for controlling the first wheel assembly, a second controller for controlling the second wheel assembly, and a battery for supplying power to the first and second controllers. The first and second controllers can be positioned above a central longitudinal axis of the first and second axles.

According to some embodiments, the first and second housings can include a first and second platform configured to support the user's feet and a first and second fender extending upwards from the first and second platform. A clearing distance between a bottom portion of the first and second housings and a riding surface can be less than two inches when the platforms are parallel with the riding surface.

According to some embodiments, a ratio between a length of the support member and a length of the vehicle can be approximately 0.2.

According to some embodiments, a central portion of the support member can be sleeved with a spacer.

According to some embodiments, the first controller can be fixed in the first housing, and the second controller can be fixed in the second housing.

According to some embodiments, the battery can be located in an inner cavity of the first housing.

According to some embodiments, the first housing can include a first upper housing and a first lower housing. The first upper housing and the first lower housing can be fastened together to form an inner cavity of the first housing.

According to some embodiments, the second housing can include a second upper housing and a second lower housing. The second upper housing and the second lower housing can be fastened together to form an inner cavity of the second housing.

The preceding Summary is provided solely as a high-level discussion of certain aspects of some embodiments within the scope of this disclosure. Neither the preceding summary nor the following Detailed Description and the associated drawings limit or define the scope of protection. The scope of protection is defined by the claims.

BRIEF DESCRIPTION OF THE DRAWINGS

Certain features, aspects, and advantages are described below with reference to drawings of an example embodiment. The drawings are intended to illustrate, but not to limit, the present disclosure. Some embodiments do not include all of the features shown in the drawings. No feature is essential, critical, or indispensable.

DETAILED DESCRIPTION OF CERTAIN EMBODIMENTS

Figure 1A:
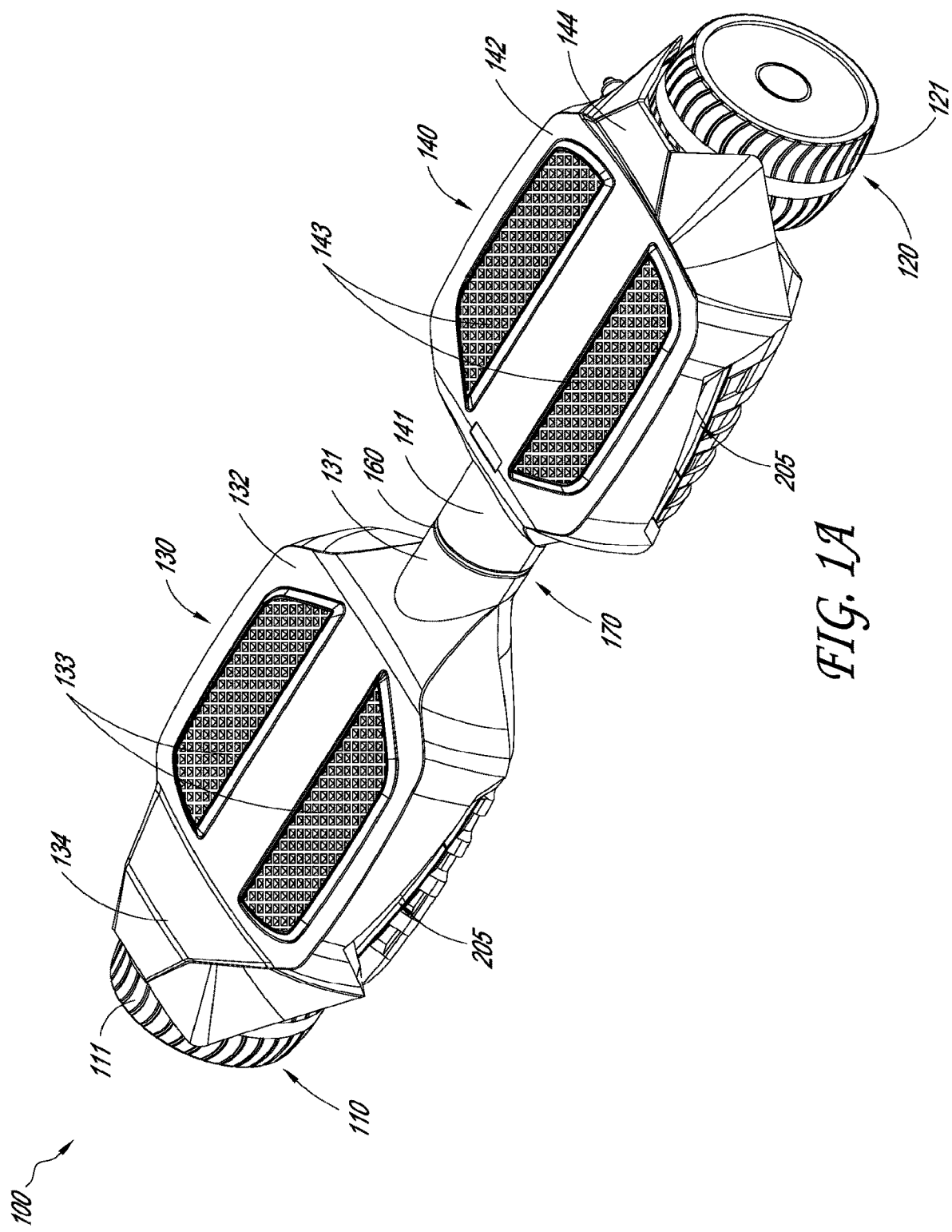
FIG. 1A is a perspective view of an embodiment of an electric balance vehicle.

Various embodiments of the electric balance vehicle will now be discussed. Although certain specific embodiments of the electric balance vehicle are described, this disclosure is not limited to only these embodiments. On the contrary, the described embodiments are merely illustrative. This disclosure is intended to also cover alternatives, modifications and equivalents. Furthermore, in the following description, numerous specific details are set forth in order to provide a thorough understanding of the disclosed technology to one of ordinary skill in the art. However, embodiments may be practiced without these specific details.

In some embodiments, the electric balance vehicle 100 can be small and/or compact. The electric balance vehicle 100 can be lightweight (e.g., less than 15 lbs.). The electric balance vehicle 100 can be less than approximately 16 lbs. The electric balance vehicle 100 can be approximately 11.5 lbs. The electric balance vehicle 100 can be between approximately 10-15 lbs. In various embodiments, the electric balance vehicle 100 can be easily portable. In some embodiments, the electric balance vehicle 100 is capable of being carried in, or secured to, carrying bags or cases. For example, in some variants, the electric balance vehicle 100 can be carried in, or secured to, a standard backpack. In various embodiments, the electric balance vehicle 100 can be stored in small spaces. For example, in some embodiments, the electric balance vehicle 100 can be stored in a locker.

FIGS. 1A-7 illustrate an electric balance vehicle 100. The electric balance vehicle 100 includes a first wheel assembly 110 and a second wheel assembly 120 on opposite ends of the electric balance vehicle 100. The first wheel assembly 110 can include a first wheel 111. The second wheel assembly 120 can include a second wheel 121. As illustrated, a first housing 130 and a second housing 140 can be positioned between the first and second wheel assemblies 110, 120. The electric balance vehicle 100 can include a deck for the user to stand on. The first and second housings 130, 140, respectively, can comprise platforms 132, 142. The platforms 132, 142 can be disposed on a top portion of the deck and be configured to support a user, such that the user can place a respective foot on each of the platforms 132, 142. The width of the platforms 132, 142 can be approximately 135-175 mm. In some embodiments, the width of the platforms 132, 142 is approximately 170 mm. In some embodiments, the width of the platforms 132, 142 is approximately 140 mm. In some embodiments, the width of the platforms 132, 142 is less than 150 mm. In some embodiments, a bottom portion of the deck and/or housings 130, 140 can be configured to keep particles (e.g., rocks, twigs, etc.) out of the housings 130, 140. This can inhibit or prevent outside elements from interfering with the proper functioning of the electric balance vehicle 100. The first housing 130 and the second housing 140 can be rotatable relative to each other. In some embodiments, a driver can control the electric balance vehicle 100 by rotating the platforms 132, 142 during use. The platforms 132, 142 can comprise anti-sliding surfaces 133, 143 (e.g., textured rubber or silicone pads) such that the user can maintain his or her feet on the platforms 132, 142.

In some embodiments, one or both of the first wheel assembly 110 and the second wheel assembly 120 includes a drive motor (not shown) and/or a brake (not shown). The motor (e.g., a hub motor) and/or the brake can be located within the wheels 111, 121. Various types of motors are contemplated, such as any of the motors described in the U.S. Pat. No. 9,638,285, issued May 2, 2017, the entirety of which is hereby incorporated by reference. In some embodiments, each wheel 111, 121 comprises a motor and/or brake. For example, in some embodiments, the first wheel 111 contains a first motor and the second wheel 121 contains a second motor. The entireties of each of the motors can be disposed within the wheels 111, 121 without extending into the inner cavities 137, 147 of the housings 130, 140. For example, in some embodiments, each motor comprises a stator and a rotor and the entire rotor and/or the entire stator is positioned inside a respective one of the wheels 111, 121. In certain embodiments, the motors for the wheels 111, 121 are not positioned in and/or contained by the housings 130, 140. Having the motors in the wheels can, for example, reduce the height of the vehicle 100, can reduce the number of components within the housings 130, 140, can allow the housings 130, 140 to be made vertically thinner (compared to a vehicle with motors in the housing), can facilitate repair and/or replacement of the motors, and/or otherwise. In some implementations, the wheels, and the motors contained in the wheels, can be readily changed. This can, for example, allow a user to select a different motor and wheel combination to accommodate a particular type of riding of the vehicle (e.g., a first type of motor and wheel for sport riding and a second type of motor and wheel for long-distance riding, etc.).

In some embodiments, the motor can have different modes. For example, the motor can have a high torque mode in which the torque is increased by 5-15%. In some variants, the motor can have a quiet mode in which the maximum speed is reduced, reducing the amount of noise produced by the vehicle 100.

The wheels 111, 121 can be the same or similarly sized as traditional skateboard or longboard wheels, or may be larger. The diameter of the wheels 111, 121 can be approximately 83 mm. In some embodiments, the diameter of the wheels 111, 121 can be less than approximately 150 mm, less than approximately 100 mm, and/or less than approximately 90 mm. In some embodiments, the wheels 111, 121 can be made out of polyurethane, rubber, plastic, or other suitable materials. In some embodiments, the diameters of the wheel assemblies 110, 120 are shorter than the widths of the platforms 132, 142 and/or the fenders 134, 144. In some embodiments, the diameters of the wheel assemblies 110, 120 are shorter than the widths of the battery 270 and/or controllers 272, 274. In some embodiments, as illustrated, the top portions of the wheel assemblies 110, 120 are higher than the platforms 132, 142, respectively (e.g., approximately 20 mm higher). In some embodiments, the top portions of the wheel assemblies 110, 120 can be level with the platforms 132, 142.

Figure 3:
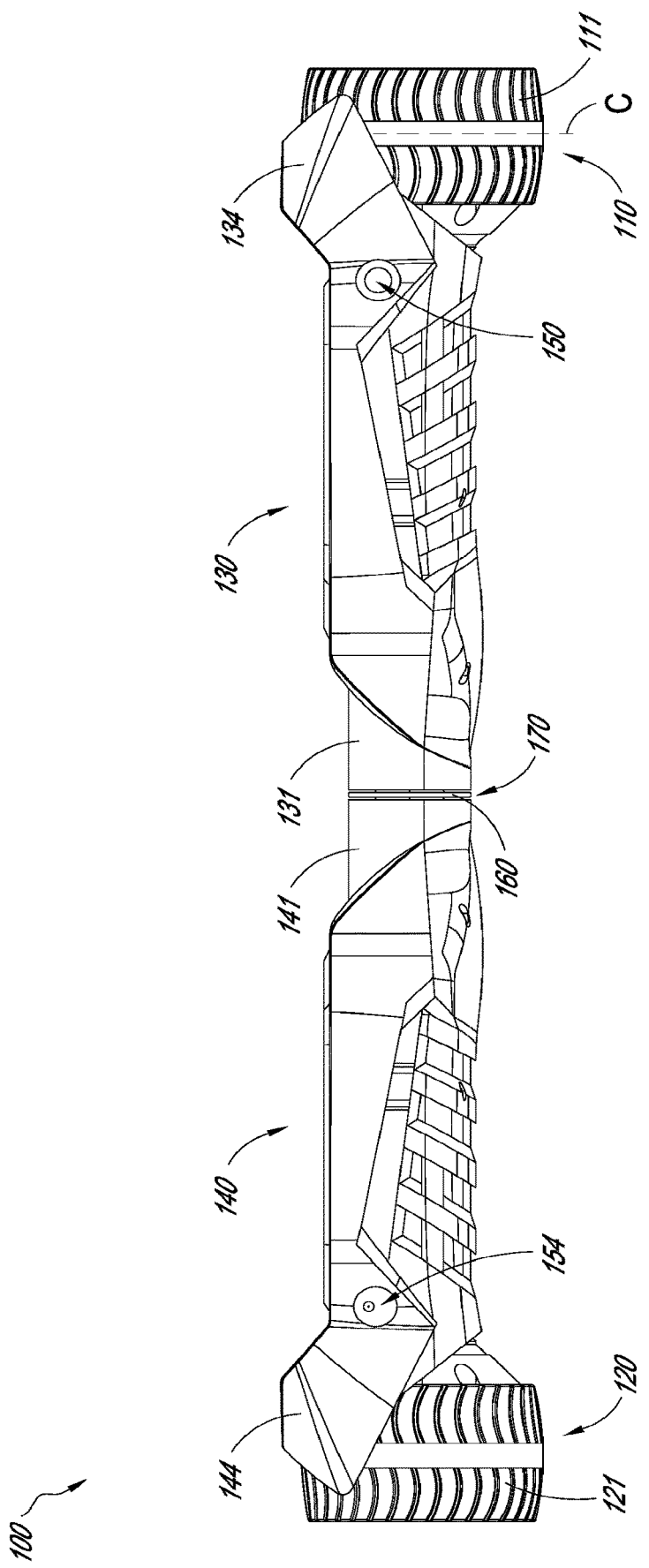
FIG. 3 is a rear view of the electric balance vehicle of FIG. 1A.
Figure 5:
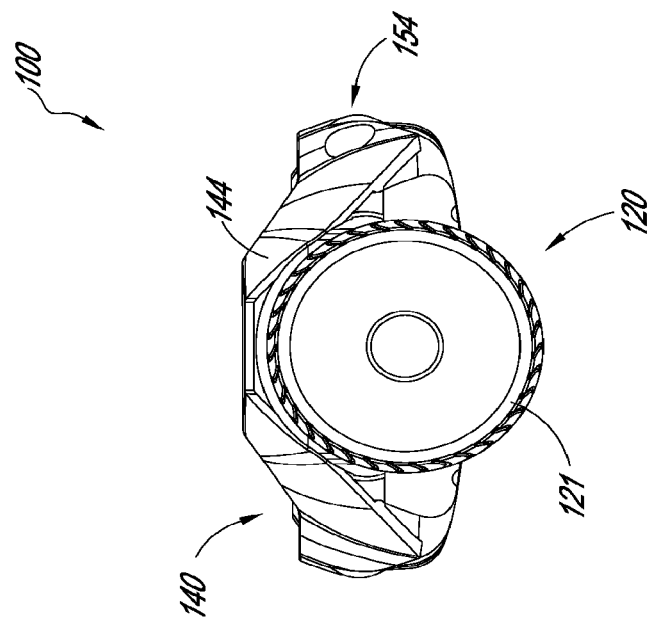
FIGS. 4-5 are side views of the electric balance vehicle of FIG. 1A.
Figure 4:
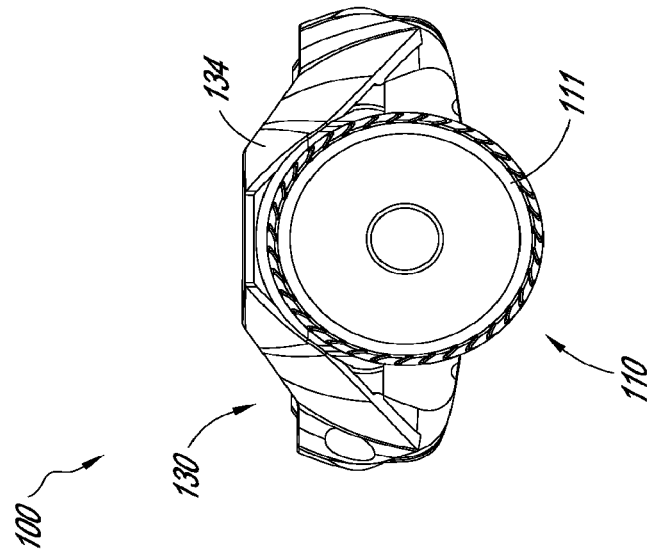
Figure 6:
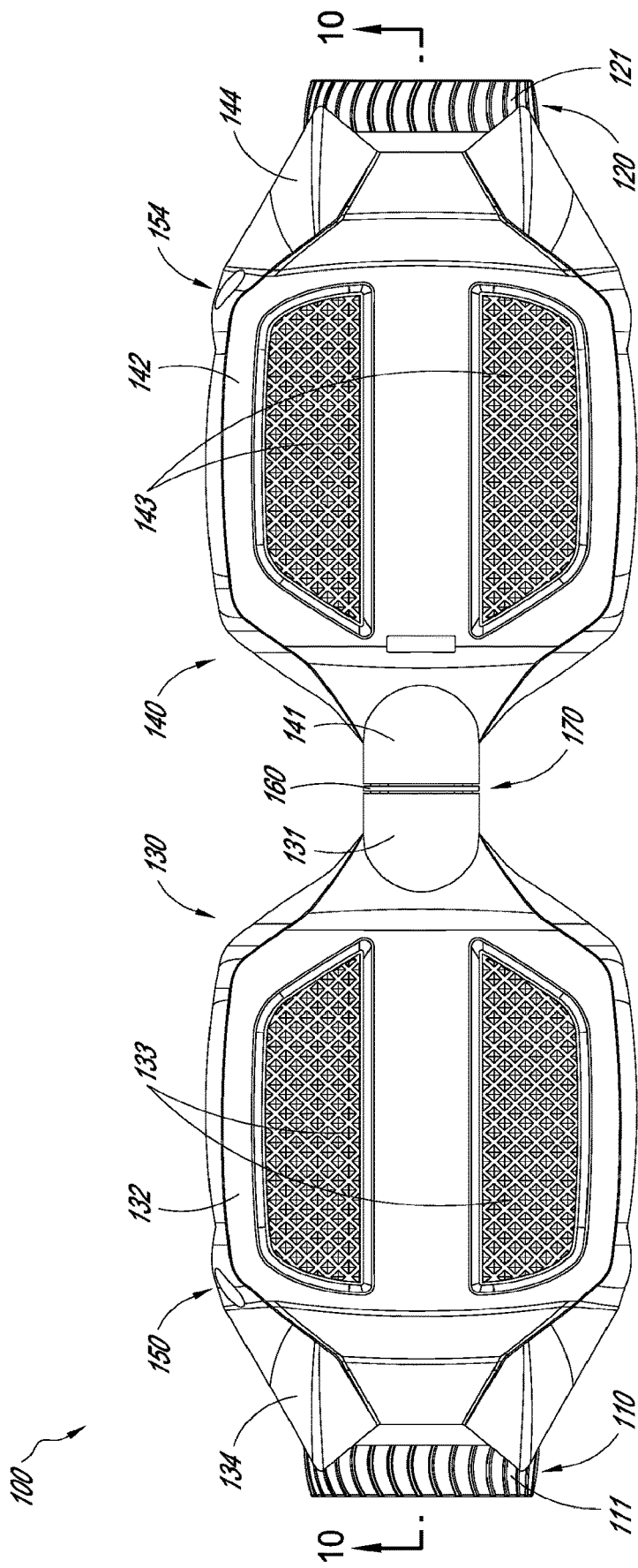
FIG. 6 is a top view of the electric balance vehicle of FIG. 1A.
Figure 7:
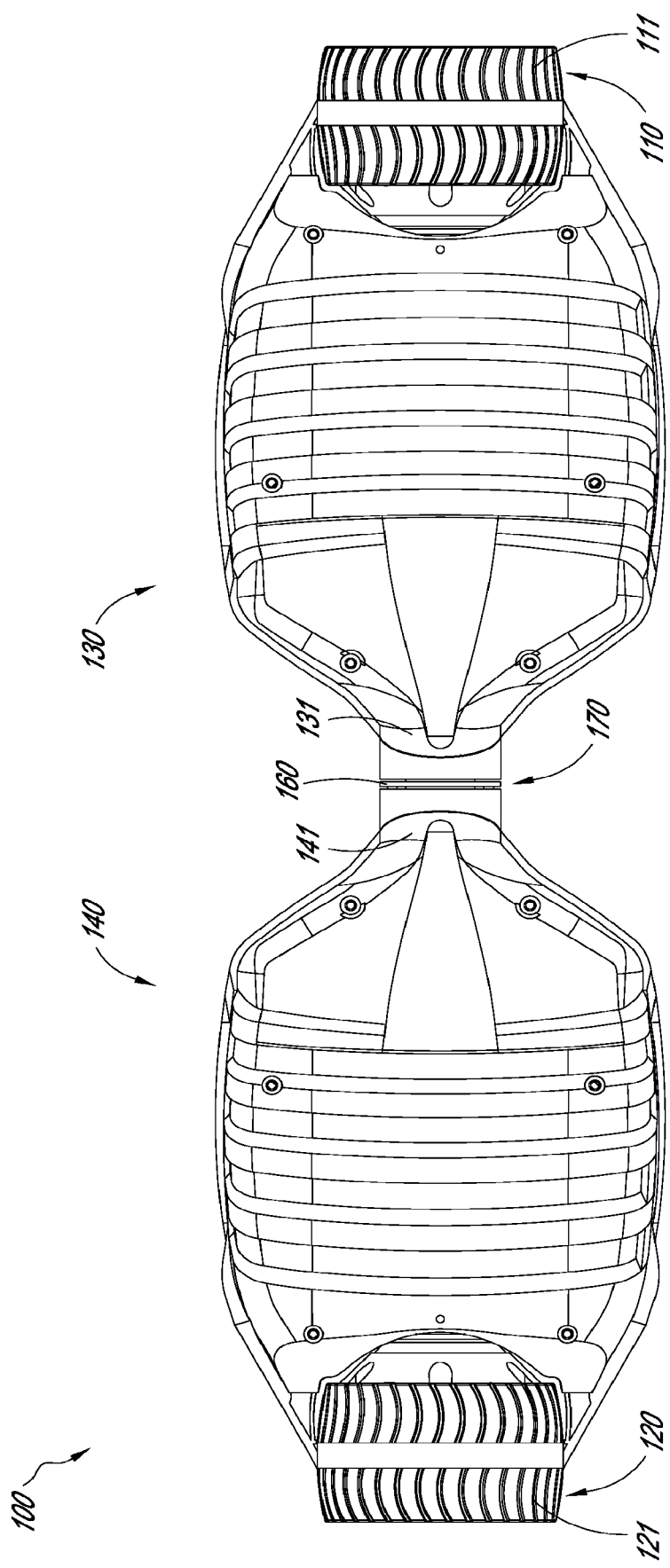
FIG. 7 is a bottom view of the electric balance vehicle of FIG. 1A.

The wheel assemblies 110, 120 can comprise a tire (e.g., a rubber tire) mounted on an outer side of a rim. Vehicles having tires with substantially rectangular front and rear profiles can struggle to maintain consistent contact with the ground when the vehicle is flexed and/or turning, which can impact the user's riding experience such as by reducing the stability and/or traction of the vehicle. In some embodiments, as illustrated in FIG. 3, the sidewalls, or front and rear profiles, of the tires are rounded, bowed, and/or curved such that there is an apex at the center of each tire (e.g., where axis C, an axis extending vertically along the center of the front and rear faces of the tire, would intersect the ground while the vehicle 100 is in use). The curved profiles of the tires can be substantially continuous and/or smooth between the axial ends of the tires (e.g., the ends of the tires to the lateral sides of axis C). In some embodiments, the electric balance vehicle 100 is configured to maintain substantially the same amount of surface area of tire contacting the ground and/or substantially the same amount of traction even when the vehicle 100 is flexed during normal operation (such as when the vehicle 100 goes around a turn), unlike a vehicle having flatter tires (e.g., tires having more rectangular front and rear profiles) which can have less contact with the ground and altered riding characteristics (e.g., traction) when the vehicle is flexed and/or turning.

In some embodiments, the tires and/or wheels 111, 121 can have generally square front and rear profiles. In some embodiments, the ratio between the width and the diameter and/or height of the tires and/or wheels 111, 121 can be approximately 0.4-1.0. The ratio between the width and diameter of the wheels 111, 121 can be approximately 0.6. A tire and/or wheel 111, 121 having a generally square front and rear profile (such as a wheel 111, 121 having a width that is at least 50% as long as its diameter) can contribute to the stability of the vehicle 100, increase the amount of surface area of the tire contacting the ground during operation of the vehicle 100, improve the traction of the vehicle 100, and/or enable a motor to fit within the wheel 111, 121.

The electric balance vehicle 100 can include any feature or combination of features of the vehicle described in application Ser. No. 15/941,505, filed Mar. 30, 2018, the entirety of which is hereby incorporated by reference herein.

Figure 2:
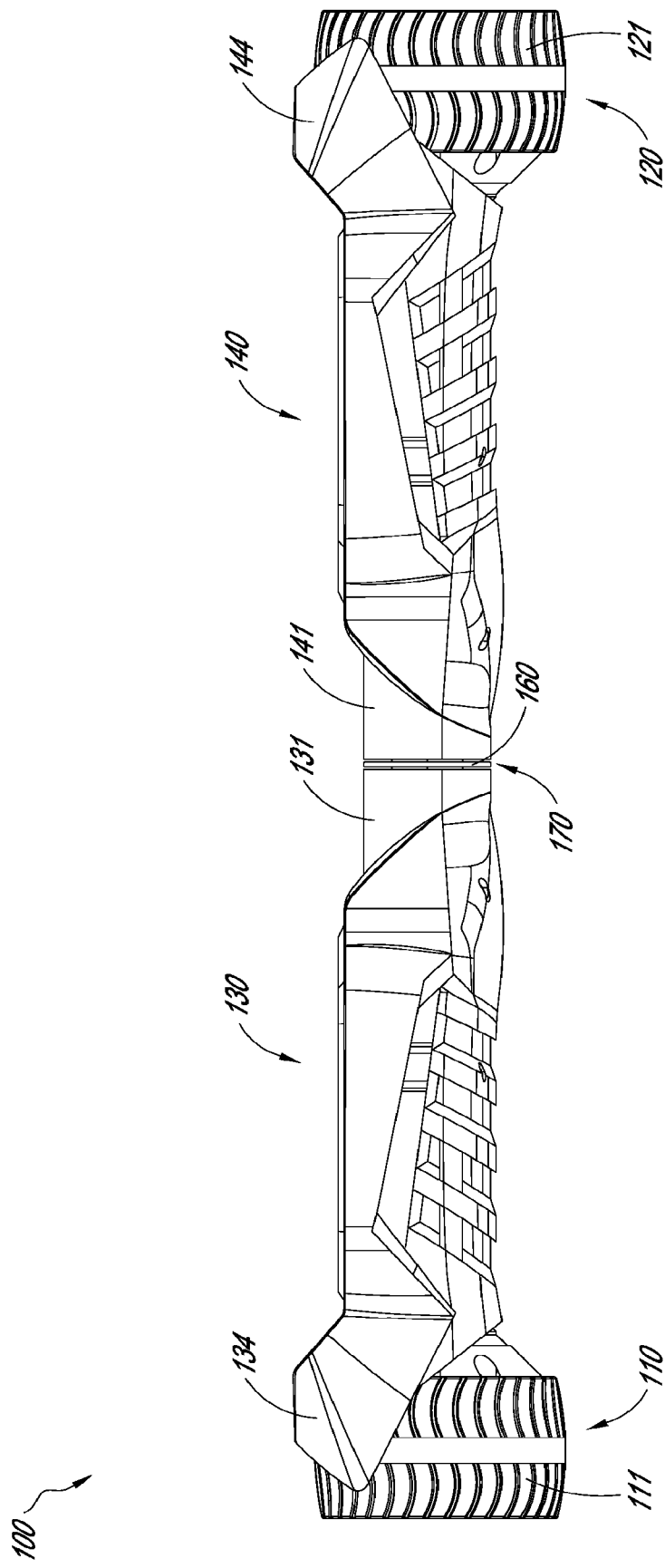
FIG. 2 is a front view of the electric balance vehicle of FIG. 1A.

In some embodiments, the electric balance vehicle 100 is configured to sit low to the ground and have a low center of gravity. This can enable the user to have more control over the vehicle 100 and/or to have a safer riding experience (e.g., to reduce the risk of an injury). In some embodiments, the clearing distance or clearance between the riding surface (e.g., the ground) and the underside or bottom portion of the housings 130, 140 can be approximately 20 mm when the platforms 132, 142 are parallel with the riding surface. In some embodiments, the clearing distance can be between approximately 0.5-3 in. In certain embodiments, the vehicle 100 is substantially longer than it is tall. For example, in some embodiments, the ratio of the overall length of the vehicle 100 (measured along the longitudinal axis) to the overall height of the vehicle 100 (measured from the bottom of one of the wheels 111, 121 to the top of the corresponding fender 134, 144) is at least about: 4:1, 5:1, 6:1, 7:1, 8:1, or otherwise. In certain variants, as shown in FIG. 2, the axial thickness of the wheels 111, 121 (measured along the longitudinal axis of the vehicle 100) is the same as or similar to (e.g., within +/−10%) the vertical thickness of the corresponding housing 130, 140. In some implementations, the ratio of the diameter of the wheels 111, 121 to the vertical thickness of the corresponding housing 130, 140 is less than or equal to about: 3:1, 2:1, 1.8:1, 1.5:1, or otherwise. The thickness of the housings 130, 140 can be measured at the thickest portion of the housings 130, 140 where a user would normally place a foot (e.g., the location of the anti-sliding surfaces 133, 143).

In some embodiments, the first and second housings 130, 140 each comprise a tapered region 131, 141. The tapered regions 131, 141 can terminate at a neck or a central region 170. The central region 170 can include a spacer 160. The spacer 160 can be located between the first and second housings 130, 140. In some embodiments, the tapered regions 131, 141 have a substantially or completely circular axial cross-section at the central region 170. In some embodiments, substantially no gaps or projections are provided between the first and second housings 130, 140 during rotation of the first housing 130 relative to the second housing 140 and/or vice versa. In some embodiments, the circumference of the tapered regions 131, 141 is configured to be graspable by a user's hand for lifting and carrying the electric balance vehicle 100. For example, in some embodiments, the diameter of the regions 131, 141 is about 1-3 in. In some embodiments, the first and second housings 130, 140 are laterally generally symmetrical about the central region 170, as illustrated in FIGS. 1A and 2.

In some embodiments, the tapered regions 131, 141 taper down to a neck with a minimum diameter at the central region 170. The minimum diameter can be substantially less than the front to rear width of the outside of the platforms 132, 142, such as at the intersection with the fender portions 134, 144. For example, the ratio of the minimum diameter of the neck to the width of the outside of the platforms 132, 142 can be at less than or equal to about: 0.5, 0.33, 0.25, 0.20, ratios between the aforementioned ratios, or other ratios. In some embodiments, the ratio of the diameter of the central region 170 to the thickness of the housings 130, 140 can be approximately 0.5-0.95.

The first and second housings 130, 140 can comprise fender portions 134, 144. The fender portions 134, 144 can extend upwards (e.g., in a vertical direction) from and/or relative to the platforms 132, 142. The fender portions 134, 144 can provide a barrier between the platforms 132, 142 and the wheel assemblies 110, 120. In some embodiments, the fenders 134, 144 can include a lip at least partially encasing or shielding wheels 111, 121 of the wheel assemblies 110, 120, respectively. For example, as shown, the lip can extend laterally outwardly over a portion of the wheels 111, 121. In some embodiments, the fender portions 134, 144 can extend over approximately 40%-90% of the widths of the wheels 111, 121. Having fender portions 134, 144 extending above the wheels 111, 121 can reduce or minimize the amount of matter (e.g. rocks, debris, water, etc.) that is propelled towards the user due to the rotation of the wheels 111, 121. The electric balance vehicle 100 can include gaps between the fender portions 134, 144 and the wheels 111, 121.

The electric balance vehicle 100 can comprise electrical controls and interfaces. For example, as shown in FIG. 3, the electric balance vehicle 100 can have a power switch 150 and/or a charging interface 154. The power switch 150 and charging interface 154 can be positioned on either of the first or second housings 130, 140. In some embodiments, the power switch 150 is on the first housing 130 and the charging interface 154 is on the second housing 140, or vice versa. The power switch 150 can be configured to turn on and off the electric balance vehicle 100. The charging interface 154 can be configured to provide an electrical power input, such as to charge a power source (e.g., a battery 270) of the electric balance vehicle 100. The power switch 150 and/or the charging interface 154 can extend through an outer wall of the first and/or second housing 130, 140. In some embodiments, the electric balance vehicle 100 can include a power meter or electrical status indicator. For example, the indicator can comprise one or more lights (e.g., LEDs). The lights can be arranged and/or colored to indicate charging status and/or power level of the electric balance vehicle 100.

The first and second housings 130, 140 can comprise decorations, which can be different shapes and sizes. For example, the housings 130, 140 can include decorations 205, such as headlights and/or light strips. In some embodiments, the first and second housings 130, 140 are plastic. For example, the housings 130, 140 can be manufactured from injection molded hard plastic.

The first housing 130 can comprise an upper housing 136 and a lower housing 138. The upper housing 136 and the lower housing 138 can be coupled together to enclose or partially enclose an interior space or inner cavity 137 (See FIG. 8). In some embodiments, the upper housing 136 is abutted against and/or secured to (e.g., with screws, bolts, rivets, hooks, or otherwise) the lower housing 138. In an assembled state, the first housing 130, formed of the upper and lower housings 136, 138, can have the appearance of an integral body. In some embodiments, the upper housing 136 and the lower housing 138 can be connected together with a plurality of fasteners such as screws or bolts. For example, the screws can be extended from a lower side of the lower housing 138 and extended into the upper housing 136. In some embodiments, the upper housing 136 is coupled with the lower housing 138 at any of corresponding fastener stems 239 extending from the upper and/or lower housings 136, 138. In some embodiments, the fastener stems 239 can be interlocking mechanisms capable of providing structural support to the upper and lower housings 136, 138.

The second housing 140 can comprise an upper housing 146 and a lower housing 148 that can be coupled together to enclose an interior space or cavity 147. In some embodiments, the upper housing 146 and the lower housing 148 are connected together with fasteners such as screws or bolts, such as at any of corresponding fastener stems 239 extending from the upper and/or lower housings 146, 148. In some embodiments, the fastener stems 239 can be interlocking mechanisms capable of providing structural support to the upper and lower housings 146, 148. In an assembled state, the second housing 140, formed by the upper and lower housings 146, 148, can have the appearance of an integral body.

Figure 8:
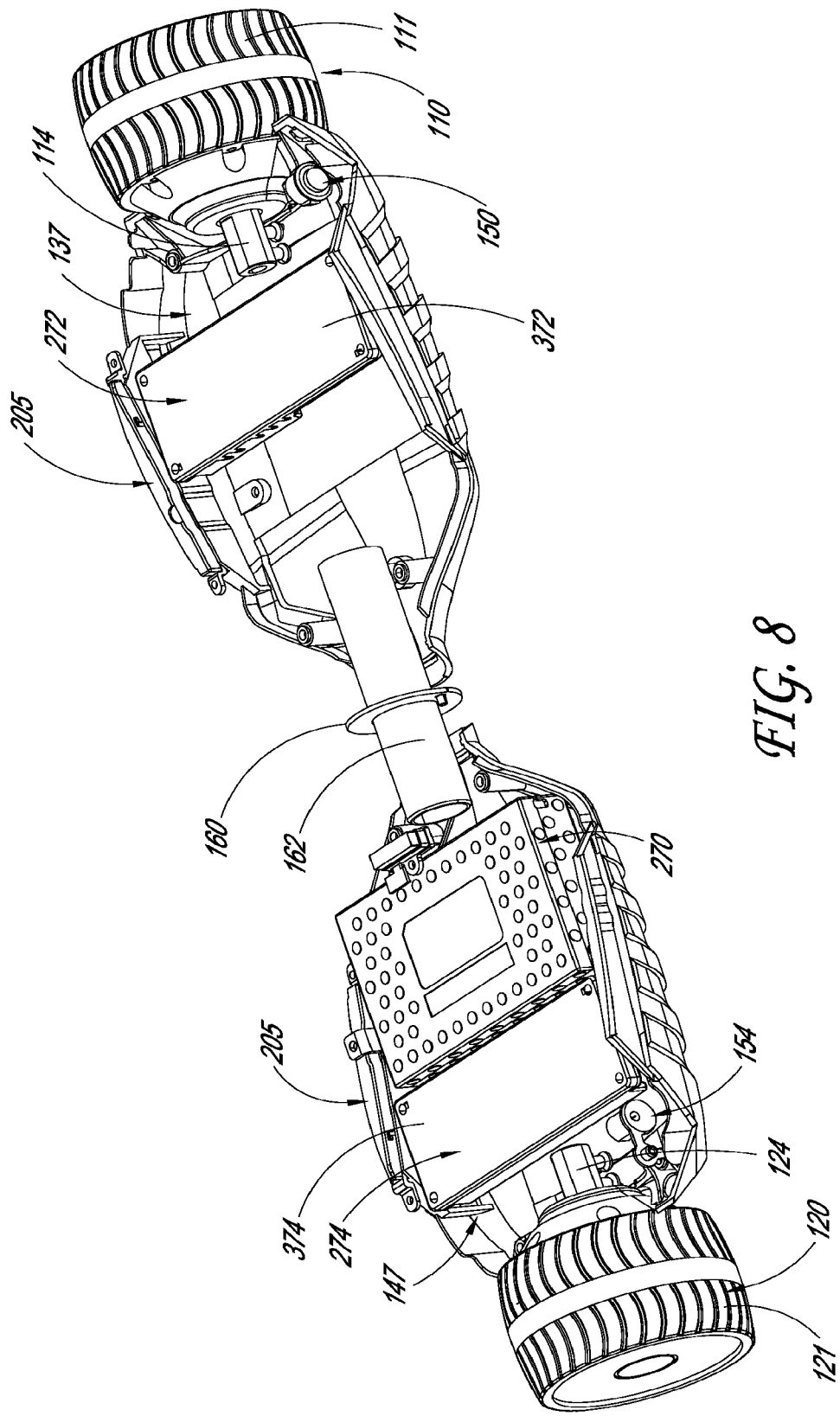
FIG. 8 is a perspective view of a portion of the electric balance vehicle of FIG. 1A.

As shown in FIG. 8, the electric balance vehicle 100 can comprise a connection or support member 162. The support member 162 can be configured to support and/or connect the housings 130, 140. In some embodiments, the support member 162 can have a small diameter, be lightweight, and/or be easy to manufacture. The platforms 132, 142 can be located above the support member 162 and/or in contact (e.g., direct or indirect) with the support member 162. The support member 162 can be disposed partially or entirely within the inner cavities 137, 147 of the housings 130, 140. In some embodiments, the support member 162 is a tubular member, pipe, bar, or other elongate structure. In some embodiments, the support member 162 can be coupled to one or both of the wheels 111, 121.

As illustrated, the length of the support member 162 can be shorter than the total length of the electric balance vehicle 100. For example, the support member 162 can occupy the space within the tapered regions 131, 141 of the housings 130, 140, but not within a majority of the length of the housings 130, 140. In some embodiments, the support member 162 is asymmetrical about the center of the vehicle 100. For example, in some embodiments, the portion of the support member 162 that extends into the first housing 130 is shorter than the portion of the support member 162 that extends into the second housing 140. In some embodiments, approximately 30-40% of the length of the support member 162 can extend into one of the first and second housings 130, 140 and approximately 60-70% of the length of the support member 162 can extend into the other of the first and second housings 130, 140. In some embodiments, the support member 162 does not extend along the entire lengths of the housings 130, 140. For example, in some embodiments, the support member 162 does not extend beneath the platforms 132, 142. A shorter support member 162 can create space for other components in the inner cavities 137, 147 of the housings 130, 140 and/or enable the electric balance vehicle 100 to be smaller, more portable, and/or lightweight as described in more detail below. In some embodiments, a ratio of a length of the support member 162 relative to a total length of the electric balance vehicle 100 (including the first and second wheel assemblies 110, 120) is approximately 0.2. In some embodiments, the ratio of the length of the support member 162 to the total length of the vehicle 100 is between 0.1 and 0.3. The total length of the vehicle 100 can be approximately 490 mm. In some embodiments, the total length of the vehicle 100 can be less than 550 mm, less than 500 mm, etc.

The support member 162 can be continuous (e.g., without interruptions or gaps) from end to end. In some embodiments, the support member 162 can extend substantially completely between the first and second wheel assemblies 110, 120. In some embodiments, the support member 162 can be configured to support the weight of the user, such as to transfer the weight of a rider between the housings 130, 140. In some variants, during normal operation of the vehicle 100, the support member 162 is configured to not bend (appreciably to a user) at the longitudinal midpoint of the support member 162. The support member 162 can be made from a steel tube or rod. The support member 162 can be made of an alloy, such as an aluminum alloy. The support member 162 can be treated with a stretching process that imparts increased strength and/or toughness.

In some implementations, the support member 162 can extend through portions of both the first and second housings 130, 140 and the central region 170 at the tapered regions 131, 141. The weight of the user on the platforms 132, 142 can be at least partially distributed across the length of the support member 162. Another advantage of a small diameter/volume of the support member 162 is that it can take up a small amount of space within the inner cavities 137, 147 of the first and second housings 130, 140. This can enable additional components, such as a battery with a larger capacity, to be positioned within either or both of the inner cavities 137, 147.

Figure 1B:
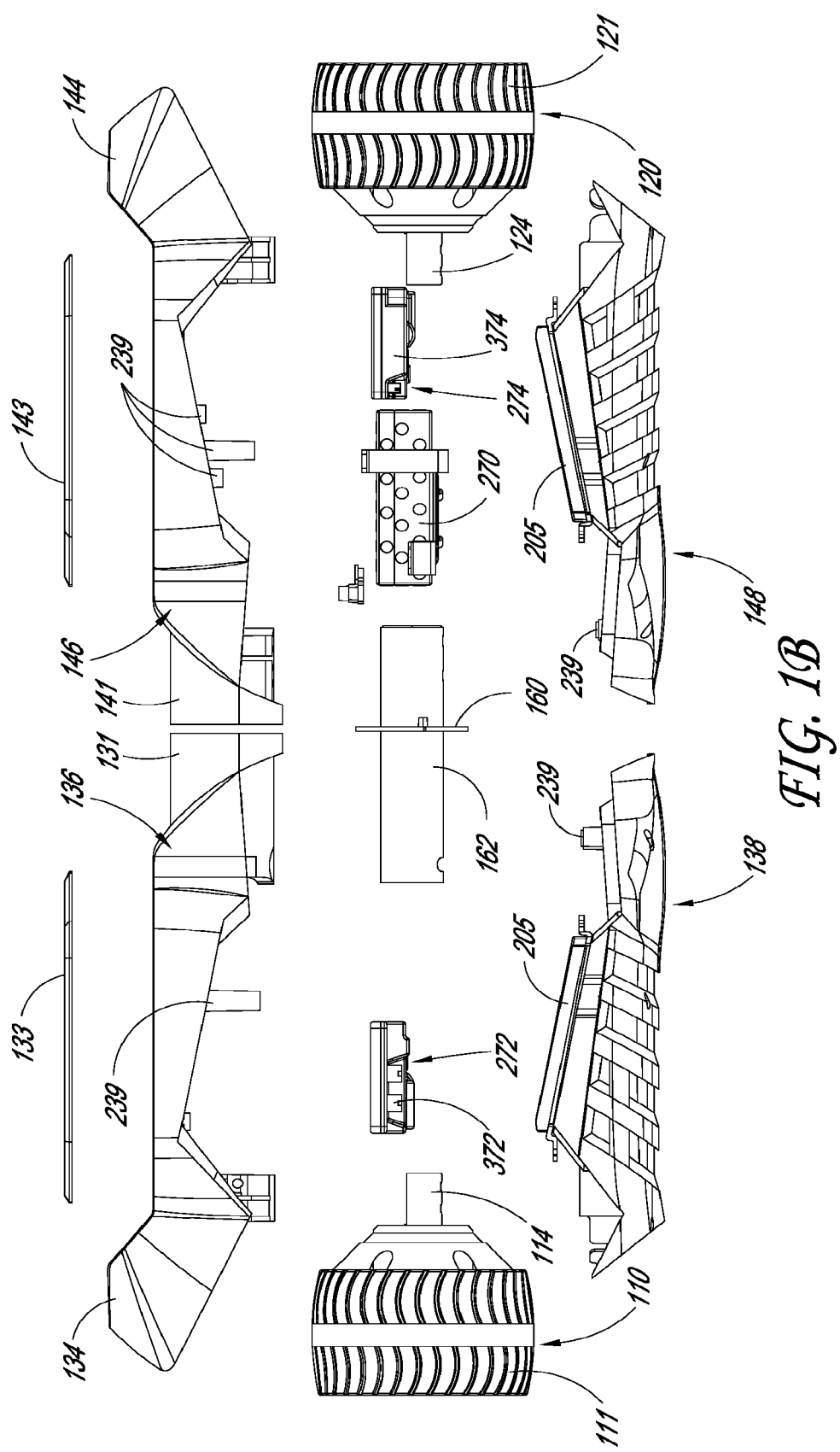
FIGS. 1B-1C are exploded views of the electric balance vehicle of FIG. 1A.
Figure 1C:
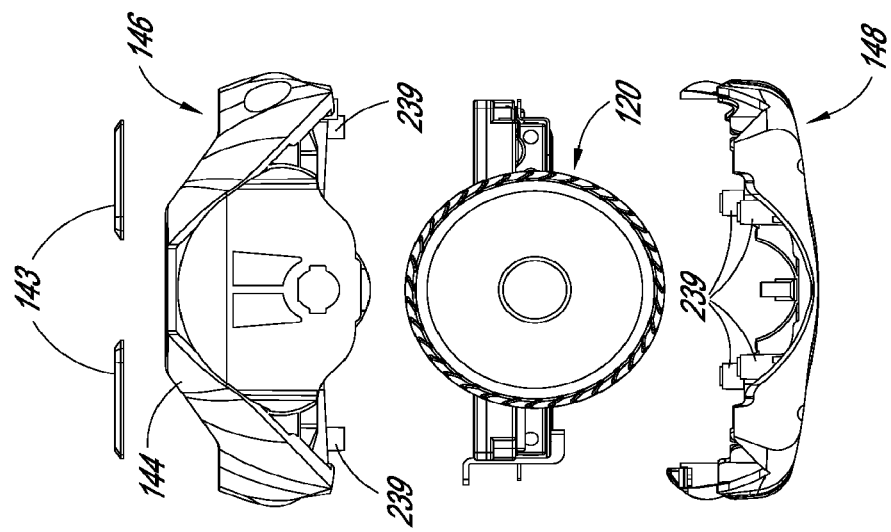

In FIGS. 1B and 8, the support member 162 is mated with a spacer 160. The spacer 160 can extend generally radially outward from the support member 162. The spacer 160 can be located between and/or extend between the first and second housings 130, 140. In some embodiments, the spacer 160 can provide a reduced-friction sliding surface for the relative rotation of the first and second housings 130, 140. The spacer 160 can be configured to substantially isolate the first housing 130 and the second housing 140. For example, movement and/or vibration of one housing can be inhibited or prevented from being transferred to the other housing. The spacer 160 can be assembled on the support member 162 by sliding it axially onto the support member 162. In some embodiments, adjustments to the axial position of the spacer 160 with respect to the support member 162 can be made as necessary during assembly of the electric balance vehicle 100. In some embodiments, the spacer 160 and the support member 162 are integrally formed. In some embodiments, the spacer 160 can be made from a material different from that of the support member 162 and/or the material of the spacer 160 and can be coordinated with the color design of the electric balance vehicle 100.

The spacer 160 can include a channel configured to enable wiring to extend from the inner cavity of one housing to the inner cavity of the other housing without being squeezed and damaged by the rotating elements of the electric balance vehicle 100.

The electric balance vehicle 100 can include a power source, such as the battery 270. In some embodiments, the battery 270 can be a 22V lithium ion battery. The battery 270 can be positioned on any portion of, or within, the electric balance vehicle 100. For example, as illustrated, the battery 270 can be configured to be positioned within the inner cavity 147 of the second housing 140. In some embodiments, the battery 270 can be positioned within the inner cavity 137 of the first housing 130. In some embodiments, both the first and second housings 130, 140 include batteries to thereby increase the power capacity and improve the distance and cruising ability of the electric balance vehicle 100. In some embodiments, the battery 270 can be positioned above the wheels 111, 121 on the electric balance vehicle 100. In some embodiments, the battery 270 can be positioned laterally between the wheels 111, 121, such as generally in the center of the electric balance vehicle 100. In some embodiments, the battery 270 can be positioned against a flange or fender portion 134, 144 on the electric balance vehicle 100.

In some embodiments, the electric balance vehicle 100 includes control circuitry. The electric balance vehicle 100 can include one or more controllers. For example, the electric balance vehicle 100 can comprise a first controller 272 and a second controller 274 for controlling and operating the movements of the electric balance vehicle 100. In some embodiments, one controller can be configured to control each of the two wheel assemblies 110, 120 of the electric balance vehicle 100. For example, in some embodiments, the electric balance vehicle 100 can comprise a single controller with similar functionality as the first and second controllers 272, 274 located in a single housing. In the illustrated embodiment, the first controller 272 is configured to control the first wheel assembly 110 and the second controller 274 is configured to control second wheel assembly 120. The first and second controllers 272, 274 can be configured to operate and/or power corresponding drive motors of the first and second wheel assemblies 110, 120. Power and/or signal conduits (e.g., electrical cables) can extend between the first wheel assembly 110, battery 270, and first controller 272 and/or between the second wheel assembly 120, battery 270 and second controller 274. In some embodiments, a power and/or signal cable can extend between the first and second controllers 272, 274 such as to coordinate control of the first and second wheel assemblies 110, 120.

In some embodiments, the inner cavities 137, 147 of the housings 130, 140 can include one or more chambers or compartments configured to support the battery 270, controllers 272, 274, and/or other components.

The electric balance vehicle 100 can include one or more inertial sensors (e.g., gyroscopes and/or accelerometers) for sensing the rotation of the first and second housings 130, 140. There can be two or more groups of inertial sensors provided in the first housing and the second housing 130, 140, respectively. In some embodiments, the inertial sensors are on the same circuit boards as the controllers 272, 274.

The controllers 272, 274 can receive data signals from the inertial sensors. Data signals from the inertial sensors can be used for controlling rotation of the first and second wheel assemblies 110, 120, as discussed further below. Each of the first and second controllers 272, 274 can be communicatively coupled to a set or single inertial sensor and operate according to the data signal from that set or single inertial sensor.

The first and second controllers 272, 274 can each be connected with either of the upper or lower housings of the housings 130, 140. In some embodiments, the first and second controllers 272, 274 can each be encased in respective controller housings 372, 374. In some embodiments, a controller can be positioned on one lateral side of the electric balance vehicle 100 and the battery 270 can be positioned on the opposing lateral side of the electric balance vehicle 100. As illustrated, in some embodiments, the battery 270 and one of the controllers 272, 274 can be positioned to one lateral side of the support member 162 and the other of the controllers 272, 274 can be positioned to the other lateral side of the support member 162. The battery 270 and one of the controllers 272, 274 can be positioned between the support member 162 and the wheel axle 114 or between the support member 162 and the wheel axle 124. In some embodiments, the battery 270 and one of the controllers 272, 274 can be stacked in the first or second housing 130, 140 (e.g., to a lateral side of the support member 162).

In some embodiments, the electric balance vehicle 100 can be configured such that no motor controlling and/or powering components of the electric balance vehicle 100 are positioned beneath the deck and/or housings 130/140. For example, in some variants, the battery 270 and controllers 272, 274 are not positioned beneath the user's feet. In some embodiments, the battery 270 and/or one or more of the controllers 272, 274 are located outside of the interior spaces 137, 147, such as on the fenders 134, 144.

In some embodiments, at least one of the housings 130, 140 can rotate relative to the support member 162. For example, one of the housings 130, 140 can be configured to rotate relative to the support member 162 and one of the housings 130, 140 can be rotationally fixed relative to the support member 162.

During use of the electric balance vehicle 100, the feet of the user can rest on the platform 132 of the first housing 130 and the platform 142 of the second housing 140, respectively. The first housing 130 can be rotatable with respect to the second housing 140. A change in the feet position and/or the center of gravity of the user standing on the electric balance vehicle 100 can cause rotation of the housings 130, 140 relative to each other and/or the ground. For example, the user can shift his or her center of gravity to rotate the second housing 140, or the user can articulate his or her foot to rotate the second housing 140. The second housing 140 can rotate with respect to the first housing 130 and/or the support member 162.

The inertial sensors corresponding to the second housing 140 can transmit the data signal indicating the rotation of the second housing 140 to the controller 274. This data signal can include, for example, data indicating the amount of rotation or angle of rotation of the second housing 140 with respect to a horizontal reference point, a ground surface, the support member 162, the wheel assembly 120, and/or the first housing 130. Based on the data signal from the inertial sensors, the controller 274 can provide a control signal including instructions and/or power to operate the wheel assembly 120. The control signal can operate the second wheel assembly 120 by delivering power from the battery 270 to accelerate rotation of the wheel 121 of the wheel assembly 120, decelerate rotation of the wheel 121 of the wheel assembly 120, and/or maintain the speed or position of the wheel assembly 120. The control signal can be, for example, in the form of pulse width modulation (PWM).

In some embodiments of the electric balance vehicle 100, when the inertial sensors detect that the second housing 140 has been rotated in a forward direction, the inertial sensors can deliver the data signal to the controller 274 indicating the forward rotation and the controller 274 can send the control signal to the second wheel assembly 120 to accelerate the wheel 121 in a forward direction. In some embodiments of the electric balance vehicle 100, when the inertial sensors detect that the second housing 140 has been rotated in a backward direction, the inertial sensors can deliver the data signal to the controller 274 indicating the backward rotation and the controller 274 can send the control signal to the second wheel assembly 120 to accelerate the wheel 121 in a backward direction. In some embodiments, the controller 274 can provide power to the second wheel assembly 120 to maintain an upright position or otherwise provide balance to the second housing 140.

A change in the feet position and/or the center of gravity of the user standing on the electric balance vehicle 100 can cause rotation of the first housing 130. For example, the user can shift his or her weight or center of gravity to cause rotation of the first housing 130 or rotate his or her foot to rotate the first housing 130. The first housing 130 can be fixed with respect to the second housing 140 and/or the support member 162.

The inertial sensors corresponding to the first housing 130 can transmit the data signal indicating the rotation of the first housing 130 to the controller 272. This data signal can include, for example, data indicating the amount of rotation or angle of rotation of the first housing 130 with respect to the horizontal reference point, the ground surface, the support member 162, the wheel assembly 120, and/or the second housing 140. Based on the data signal from the inertial sensors, the controller 272 can provide a control signal including instructions and/or power to operate the first wheel assembly 110. The control signal can operate the first wheel assembly 110 by delivering power from the battery 270 to accelerate rotation of the wheel 111 of the wheel assembly 110, decelerate rotation of the wheel 111, and/or maintain the speed or position of the wheel 111. The control signal can be, for example, in PWM form.

In some embodiments of the electric balance vehicle 100, when the inertial sensors detect that the first housing 130 has been rotated in a forward direction, the inertial sensors can deliver the data signal to the controller 272 and the controller 272 can send the control signal to accelerate the first wheel assembly 110 in a forward direction. In some embodiments, when the inertial sensors detect rotation of the first housing 130 in a backward direction, the inertial sensors can deliver the data signal to the controller 272 and the controller 272 can send the control signal to accelerate the first wheel assembly 110 in a backward direction. In some embodiments, the controller 272 can provide power to the first wheel assembly 110 to maintain an upright position or otherwise provide balance to the first housing 130.

Figure 9:
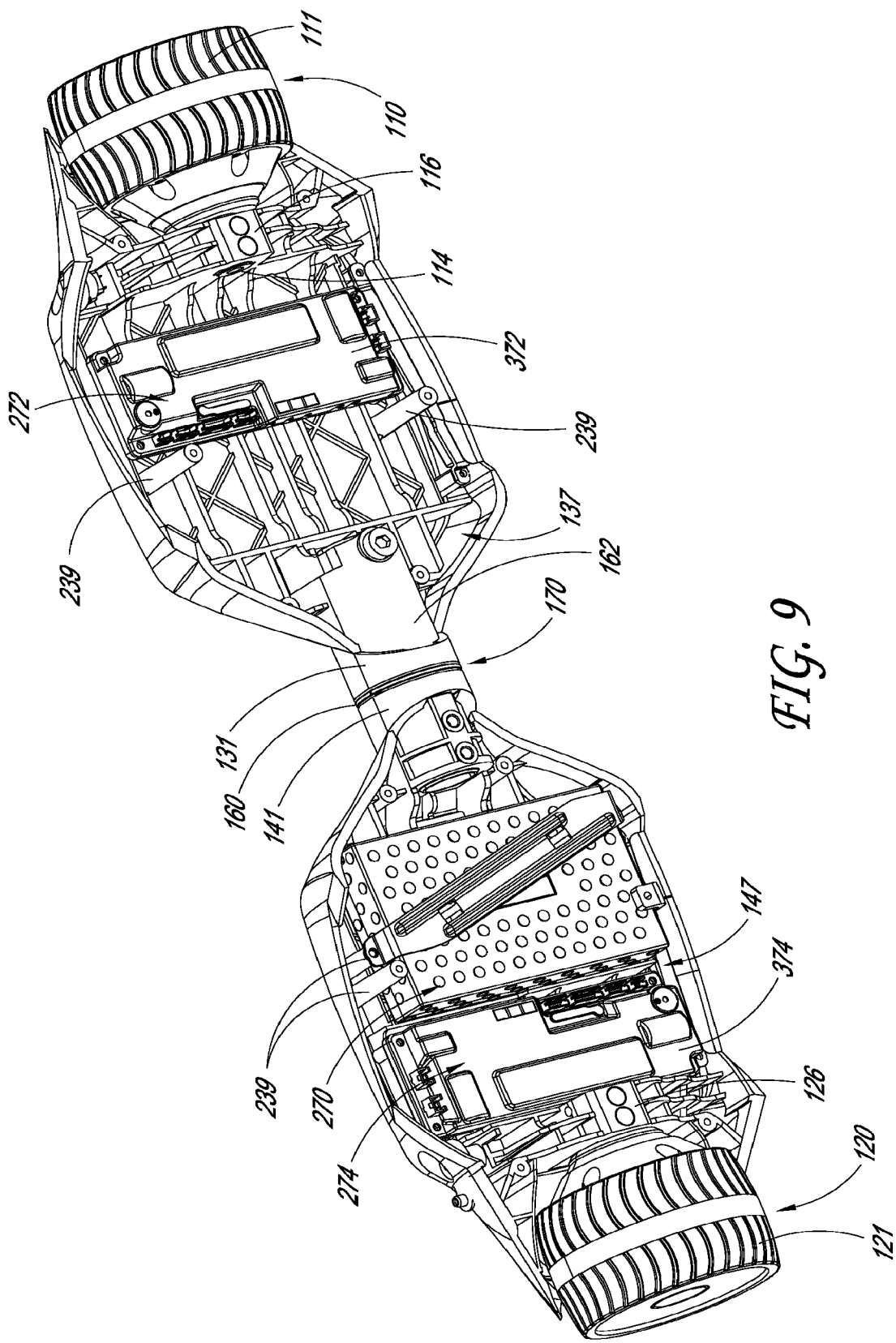
FIG. 9 is a perspective view of a portion of the electric balance vehicle of FIG. 1A.

A wheel axle 114 of the first wheel assembly 110 can extend from the wheel 111. The wheel axle 114 can extend from beneath a portion of the platform 132 to beneath at least a portion of the fender 134. The ratio of the length of the wheel axle 114 to the total length of the electric balance vehicle 100 can be less than or equal to approximately 0.1. In some embodiments, a short wheel axle 114 can leave space within inner cavity 137 of the housing 130 for other components and/or reduce the weight of the electric balance vehicle 100. The wheel axle 114 can correspond to a rotatable shaft of the drive motor of the first wheel assembly 110. The rotatable shaft can be positioned within a stator (not shown) of the drive motor within the rim of the wheel 111. In some embodiments, the rotating shaft of the drive motors is mounted inside the wheel 111 and the stator is provided within the corresponding housing or otherwise outside of the wheel 111 and the rotatable shaft coupled with the wheel 111. The axle 114 can fixedly connect with the housing 130, such as in a housing base connection feature 116 (See FIG. 9). For example, the axle 114 can be configured to receive fasteners, such as bolts, extending through the connection feature 116. In various embodiments, the axle 114 remains rotationally fixed relative to the housing 130 and the wheel 111 is rotatable relative to the housing 130.

A wheel axle 124 of the second wheel assembly 120 can extend from the wheel 121. The wheel axle 124 can extend from beneath a portion of the platform 142 to beneath at least a portion of the fender 144. The ratio of the length of the wheel axle 124 to the total length of the electric balance vehicle 100 can be less than or equal to approximately 0.1. In some embodiments, a short wheel axle 124 can leave space within inner cavity 147 of the housing 140 for other components and/or reduce the weight of the electric balance vehicle 100. The wheel axle 124 can correspond to a rotation shaft of the drive motor of the second wheel assembly 120. The wheel axle 124 can extend from a stator (not shown) of the drive motor within the rim of the wheel 121. The axle 124 can fixedly connect with the housing 140, such as in a housing base connection feature 126 (See FIG. 9). For example, the axle 124 can be configured to receive fasteners, such as bolts, extending through the connection feature 126. In various embodiments, the axle 124 remains rotationally fixed relative to the housing 140 and the wheel 121 is rotatable relative to the housing 140.

Figure 10:
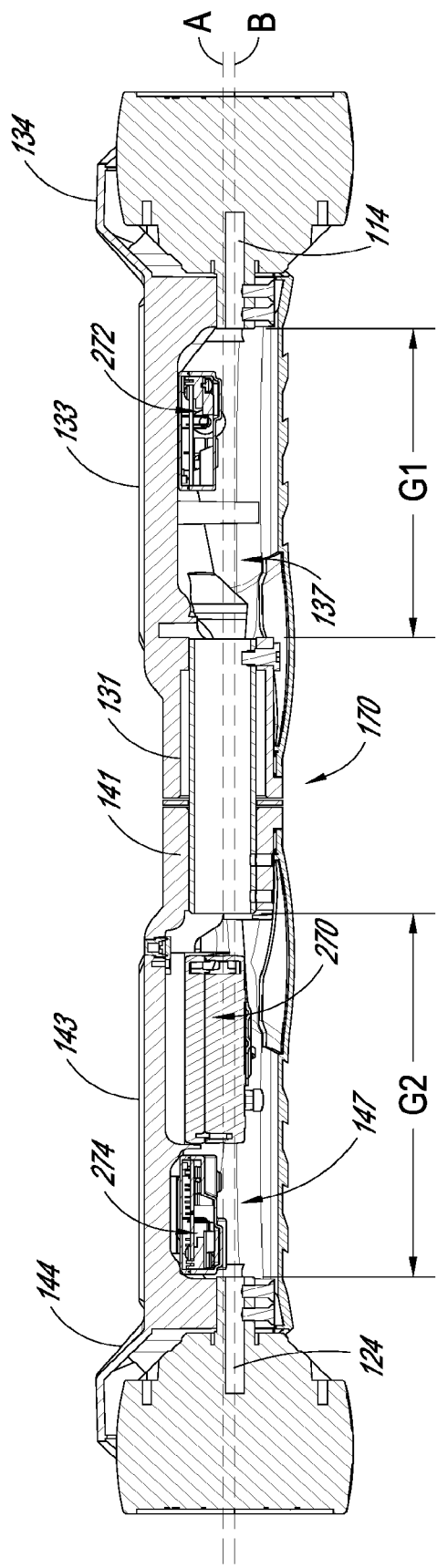
FIG. 10 is a cross-sectional view of the electric balance vehicle of FIG. 1A taken along the cut line shown in FIG. 6.

In some embodiments, as shown in FIG. 10, an axis extending longitudinally through the centers of the wheel axles 114, 124 (axis B) can be positioned lower than an axis extending longitudinally through the center of the support member 162 (axis A). This can contribute to the electric balance vehicle 100 having a low center of gravity and/or a short distance between the bottom portion of the housings 130, 140 and the ground or riding surface. In some embodiments, the central longitudinal axis of the support member 162 (axis A) intersects at least a portion of each of the battery 270 and the controllers 272, 274. In some embodiments, the battery 270 and/or controllers 272, 274 are positioned entirely above the central longitudinal axis of the support member 162 (axis A) and/or the central longitudinal axis of the wheel axles 114, 124 (axis B). For example, as illustrated, in some embodiments, the controllers 272, 274 are positioned entirely above the central longitudinal axis of the wheel axles. In some embodiments, the battery 270 and/or controllers 272, 274 are positioned entirely below the central longitudinal axis of the support member 162 (axis A) and/or the central longitudinal axis of the wheel axles 114, 124 (axis B).

In some embodiments, the wheel axles 114, 124 and the support member 162 are separate components. In some embodiments, the wheel axles 114, 124 and the support member 162 do not connect. As illustrated in FIG. 10, in some embodiments, there can be a first gap G1 in the first housing 130 between a first end of the support member 162 and the wheel 111 and/or wheel axle 114 and a second gap G2 in the second housing 140 between a second end of the support member 162 and the wheel 121 and/or wheel axle 124. Including at least one gap G1, G2 allows components of the vehicle 100 (such as the battery 270 and/or one or both of the controllers 272, 274) to be positioned to the lateral sides of the support member 162 within the housings 130, 140, unlike in vehicles with longer support members. Including at least one gap G1, G2 can reduce the dimensions of the housings 130, 140 (such as the lengths, widths, and or thicknesses of the housings 130, 140) needed to house the support member 162, the battery 270, and/or the controllers 272, 274. In some embodiments, the length of the first gap G1 can be different from the length of the second gap G2. For example, the length of the first gap G1 can be shorter than the length of the second gap G2, and vice versa. In some embodiments, the gaps G1, G2 are symmetrical about the center of the vehicle 100 and substantially the same length.

In some embodiments, the length of at least one of the gaps G1, G2 can be longer than the length of the support member 162. For example, in some variants, the ratio of the length of the support member 162 to the length of the gap G2 can be approximately 0.7-0.8. In some embodiments, the length of at least one of the gaps G1, G2 can be substantially the same as the length of the support member 162. In some embodiments, the length of the first gap G1 can be at least 50% as long as the length of the first housing 130 and/or the length of the second gap G2 can be at least 50% as long as the length of the second housing 140. In some embodiments, the length of at least one of the gaps G1, G2 can be as long as, or longer than, the combined lateral width of the battery 270 and one of the controllers 272, 274.

Some embodiments are configured to limit a rotation angle of the second housing 140 relative to the support member 162 and/or the first housing 130. For example, rotation of the second housing 140 can be limited to protect cables connecting the battery 270 with the second wheel assembly 120. Certain embodiments have a limit structure to limit the relative rotation angle of the second housing 140.

In some embodiments, the electric balance vehicle 100 is configured to expand, extend, and/or increase the surface area on which the user can place his or her feet. In some embodiments, the platforms 132, 142 can open up, extend, and/or swing outward in a manner that increases the width of the deck (e.g., provides additional surface area for the user's feet). For example, in some embodiments, the platforms 132, 142 can include extendable flaps that are pivotally connected to the housings 130, 140, respectively, and are configured to pivot to an extended position in which the extended platforms can support the user's feet. In some embodiments, the support member 162 can be coupled to the extendable platforms.

The terms "first" and "second" are merely numbered for describing corresponding technical features clearly and do not represent the actual order. During particular implementations, the locations of the technical features defined by the terms "first" and "second" are interchangeable.

Terms of orientation used herein, such as "top," "bottom," "horizontal," "vertical," "longitudinal," "lateral," "outer," "inner," and "end" are used in the context of the illustrated embodiment. However, the present disclosure should not be limited to the illustrated orientation. Indeed, other orientations are possible and are within the scope of this disclosure. Terms relating to circular shapes as used herein, such as "diameter" or "radius," should be understood not to require perfect circular structures, but rather should be applied to any suitable structure with a cross-sectional region that can be measured from side-to-side. Terms relating to shapes generally, such as "circular" or "cylindrical" or "semi-circular" or "semi cylindrical" or any related or similar terms, are not required to conform strictly to the mathematical definitions of circles or cylinders or other structures, but can encompass structures that are reasonably close approximations.

The terms "approximately," "about" and "substantially" as used herein represent an amount close to the stated amount that still performs a desired function or achieves a desired result. For example, in some embodiments, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Conditional language, such as "can," "could," "might," or "may," unless specifically stated otherwise or otherwise understood within the context as used, is generally intended to convey that certain embodiments include or do not include, certain features, elements and/or steps. Thus, such conditional language is not generally intended to imply that features, elements and/or steps are in any way required for one or more embodiments.

Conjunctive language, such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require the presence of at least one of X, at least one of Y and at least one of Z.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed and/or rearranged. Further, the disclosure herein of any particular feature, aspect, method, property, characteristic, quality, attribute, element or the like in connection with various embodiments can be used in all other embodiments set forth herein. Additionally, any methods described herein may be practiced using any device suitable for performing the recited steps.

Although this invention has been disclosed in the context of certain embodiments and examples, the scope of this disclosure extends beyond the specifically disclosed embodiments to other alternative embodiments and/or uses of the invention and obvious modifications and equivalents thereof. Any system, method, and device described in this application can include any combination of the preceding features described in this and other paragraphs, among other features and combinations described herein, including features and combinations described in subsequent paragraphs. While several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Various features and aspects of the disclosed embodiments can be combined with or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A self-balancing vehicle configured to drive in a front direction and a rear direction, the vehicle comprising:
   a first section comprising:
      a first platform configured to receive and support a first foot of a user;
      a first wheel comprising a first electric motor; and
      a first controller configured to control the first electric motor;
   a second section rotatably coupled to the first section, the second section comprising:
      a second platform configured to receive and support a second foot of the user;
      a second wheel comprising a second electric motor; and
      a second controller configured to control the second electric motor;
   wherein the first and second sections are rotatably connected such that the first and second sections are configured to rotate relative to one another about an axis A;
   wherein the first and second wheels are configured to rotate about an axis B; and
   wherein the axis A intersects at least one of the first and second controllers and the axis B does not intersect the first and second controllers.

2. The self-balancing vehicle of claim 1, wherein:
   a diameter of the first wheel is less than a maximum front-to-rear width of the first platform; and
   a diameter of the second wheel is less than a maximum front-to-rear width of the second platform.

3. The self-balancing vehicle of claim 2, wherein the first and second wheels comprise a generally square front profile such that each of the first and second wheels has a width that is at least 50% of the respective diameter.

4. The self-balancing vehicle of claim 3, further comprising:
   a fender extending at least partly over the first wheel; and
   an overall length measured along a longitudinal axis of the vehicle and an overall height measured perpendicular to the longitudinal axis and from a bottom of the first wheel to a top of the fender;
   wherein the ratio of the overall length to the overall height is at least 4:1.

5. The self-balancing vehicle of claim 1, wherein the first and second sections each further include a headlight or light strip.

6. The self-balancing vehicle of claim 1, wherein the first section includes a first fender and the second section includes a second fender, the diameter of the first wheel is less than a front-to-rear width of the first fender, and the diameter of the second wheel is less than a front-to-rear width of the second fender.

7. The self-balancing vehicle of claim 1, wherein an axial thickness of the first wheel is approximately equal to a vertical thickness of the first platform, and wherein an axial thickness of the second wheel is approximately equal to a vertical thickness of the second platform.

8. The self-balancing vehicle of claim 1, further comprising a first gyroscope or accelerometer configured to sense rotation of the first section.

9. The self-balancing vehicle of claim 8, further comprising a second gyroscope or accelerometer configured to sense rotation of the second section.

10. The self-balancing vehicle of claim 1, wherein an inside of the first platform comprises a connection base, and wherein an axle of the first electric motor of the first wheel is coupled to the connection base.

11. The self-balancing vehicle of claim 10, further comprising a bolt fixedly connecting the axle and the connection base.

12. The self-balancing vehicle of claim 10, wherein the inside of the first platform further comprises a plurality of ribs supporting the connection base.

13. The self-balancing vehicle of claim 1, wherein the first platform comprises a textured rubber or silicone anti-sliding surface, and wherein the diameter of the first wheel is less than a maximum front-to-rear width of the anti-sliding surface.

14. The self-balancing vehicle of claim 1, wherein the first platform is coupled to a first lower housing, wherein a vertical distance between a top of the first wheel and the first platform is less than a vertical clearance between a bottom of the first lower housing and a bottom of the first wheel.

15. The self-balancing vehicle of claim 1, wherein the first and second platforms are made of injection molded hard plastic.

* * * * *